(12) United States Patent
Muller et al.

(10) Patent No.: US 7,353,360 B1
(45) Date of Patent: Apr. 1, 2008

(54) METHOD FOR MAXIMIZING PAGE LOCALITY

(75) Inventors: Shimon Muller, Sunnyvale, CA (US); Rahoul Puri, Los Altos, CA (US); Michael Wong, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 380 days.

(21) Appl. No.: 11/098,062

(22) Filed: Apr. 5, 2005

(51) Int. Cl.
*G06F 12/00* (2006.01)

(52) U.S. Cl. ............... 711/203; 709/223; 711/133; 711/159; 711/205; 711/206

(58) Field of Classification Search ............... None
See application file for complete search history.

(56) References Cited

U.S. PATENT DOCUMENTS

| | | | |
|---|---|---|---|
| 5,909,686 A | 6/1999 | Muller et al. ............ 707/104 |
| 5,920,566 A | 7/1999 | Hendel et al. ............ 370/401 |
| 5,923,847 A | 7/1999 | Hagersten et al. ...... 395/200.45 |
| 5,938,736 A | 8/1999 | Muller et al. ............ 709/243 |
| 5,940,401 A | 8/1999 | Frazier, Jr. et al. ...... 370/445 |
| 6,014,380 A | 1/2000 | Hendel et al. ............ 370/392 |
| 6,016,310 A | 1/2000 | Muller et al. ............ 370/255 |
| 6,021,132 A | 2/2000 | Muller et al. ............ 370/412 |
| 6,049,528 A | 4/2000 | Hendel et al. ............ 370/235 |
| 6,081,512 A | 6/2000 | Muller et al. ............ 370/256 |
| 6,081,522 A | 6/2000 | Hendel et al. ............ 370/389 |
| 6,088,356 A | 7/2000 | Hendel et al. ............ 370/392 |
| 6,115,378 A | 9/2000 | Hendel et al. ............ 370/392 |
| 6,128,666 A | 10/2000 | Muller et al. ............ 709/238 |
| 6,246,680 B1 | 6/2001 | Muller et al. ............ 370/389 |
| 6,308,246 B1 * | 10/2001 | Hagersten et al. ......... 711/205 |
| 6,587,866 B1 | 7/2003 | Modi et al. ............ 709/105 |
| 6,591,303 B1 | 7/2003 | Hendel et al. ............ 709/238 |
| 6,631,484 B1 * | 10/2003 | Born ........................ 710/305 |
| 6,633,946 B1 | 10/2003 | Hendel ..................... 710/317 |
| 6,667,980 B1 | 12/2003 | Modi et al. ............ 370/395.32 |
| 6,735,206 B1 | 5/2004 | Oki et al. ............ 370/395.32 |
| 2004/0098496 A1 | 5/2004 | Wolrich et al. ............ 709/230 |

OTHER PUBLICATIONS

Marr, Deborah T. et al. "Hyper-Threading Technology Architecture and Microarchitecture" *Intel Technology Journal* vol. 6, Issue 1, Feb. 14, 2002: pp. 4-57.

Magro, William. et al. "Hyper-Threading Technology: Impact on Compute-Intensive Workload" *Intel Technology Journal* vol. 6, Issue 1, Feb. 14, 2002: pp. 58-66.

(Continued)

*Primary Examiner*—Donald Sparks
*Assistant Examiner*—Alan M Otto
(74) *Attorney, Agent, or Firm*—Robert C. Kowert; Meyertons, Hood, Kivlin, Kowert & Goetzel, P.C.

(57) ABSTRACT

A method for maximizing page locality within a networking system operationally attached to a plurality of processing entities wherein each processing entity either shares or includes a corresponding memory hierarchy wherein each memory hierarchy has a table of pages temporally managed by access from the networking system is disclosed. The method includes providing at least one memory access channel to each memory hierarchy and moving information to and from pages in the memory hierarchy of a particular processing entity via its associated memory access channels.

12 Claims, 26 Drawing Sheets

OTHER PUBLICATIONS

Melvin, Steve et al. "A Massively Multithreaded Packet Processor" *NP2: Workshop on Network Processors, The 9th International Symposium on High-Performance Computer Architecture*, Anaheim, California, Feb. 8-9, 2003.

Stevens, W. Richard. TCP/IP Illustared vol. 1, Chapters 1 and 2: pp. 1-32, Addison-Wesley, 1996.

* cited by examiner

METHOD FOR MAXIMIZING PAGE LOCALITY

BACKGROUND OF THE INVENTION

1. Field of the Invention

The present invention relates to networking and more particularly to maximizing page locality.

2. Description of the Related Art

In known networked computer systems, the network interface functionality is treated and supported as an undifferentiated instance of a general purpose Input Output (I/O) interface. This treatment is because computer systems are optimized for computational functions, and thus networking specific optimizations might not apply to generic I/O scenarios. A generic I/O treatment results in no special provisions being made to favor network workload idiosyncrasies. Known networked computer systems include platform servers, server based appliances and desktop computer systems.

Known specialized networking systems, such as switches, routers, remote access network interface units and perimeter security network interface units include internal architectures to support their respective fixed function metrics. In the known architectures, low level packet processing is segregated to separate hardware entities residing outside the general purpose processing system components.

The system design tradeoffs associated with networked computer systems, just like many other disciplines, include balancing functional efficiency against generality and modularity. Generality refers to the ability of a system to perform a large number of functional variants, possibly through deployment of different software components into the system or by exposing the system to different external workloads. Modularity refers to the ability to use the system as a subsystem within a wide array of configurations by selectively replacing the type and number of subsystems interfaced.

It is desirable to develop networked systems that can provide high functional efficiencies while retaining the attributes of generality and modularity. Networked systems are generally judged by a number of efficiencies relating to network throughput (i.e., the aggregate network data movement ability for a given traffic profile), network latency (i.e., the system contribution to network message latency), packet rate (i.e., the system's upper limit on the number of packets processed per time unit), session rate (i.e., the system's upper limit on creation and removal of network connections or sessions), and networking processing overhead (i.e., the processing cost associated with a given network workload). Different uses of networked systems are more or less sensitive to each of these efficiency aspects. For example, bulk data movement workloads such as disk backup, media streaming and file transfers tend to be sensitive to network throughput, transactional uses, such as web servers, tend to also be sensitive to session rates, and distributed application workloads, such as clustering, tend to be sensitive to latency.

Scalability is the ability of a system to increase its performance in proportion to the amount of resources provided to the system, within a certain range. Scalability is another important attribute of networked systems. Scalability underlies many of the limitations of known I/O architectures. On one hand, there is the desirability of being able to augment the capabilities of an existing system over time by adding additional computational resources so that systems always have reasonable room to grow. In this context, it is desirable to architect a system whose network efficiencies improve as processors are added to the system. On the other hand, scalability is also important to improve system performance over time, as subsequent generations of systems deliver more processing resources per unit of cost or unit of size.

The networking function, like other I/O functions, resides outside the memory coherency domain of multiprocessor systems. Networking data and control structures are memory based and access memory through host bridges using direct memory access (DMA) semantics. The basic unit of network protocol processing in known networks is a packet. Packets have well defined representations when traversing a wire or network interface, but can have arbitrary representations when they are stored in system memory. Network interfaces, in their simplest forms, are essentially queuing mechanisms between the memory representation and the wire representation of packets.

There are a plurality of limitations that affect network efficiencies. For example, the number of queues between a network interface and its system is constrained by a need to preserve packet arrival ordering. Also for example, the number of processors servicing a network interface is constrained by the processors having to coordinate service of shared queues, when using multiple processors; it is difficult to achieve a desired affinity between stateful sessions and processors over time. Also for example, a packet arrival notification is asynchronous (e.g., interrupt driven) and is associated with one processor per network interface. Also for example, the I/O path includes at least one host bridge and generally one or more fanout switches or bridges, thus degrading DMA to longer latency and lower bandwidth than processor memory accesses. Also for example, multiple packet memory representations are simultaneously used at different levels of a packet processing sequence with consequent overhead of transforming representations. Also for example, asynchronous interrupt notifications incur a processing penalty of taking an interrupt. The processing penalty can be disproportionately large considering a worst case interrupt rate.

One challenge in network systems relates to hiding system latencies. Application data that is sent over the network typically originates in the main memory of one system and is eventually delivered to the main memory of another system. Network performance of a computer system can significantly degrade if the memory access latency becomes too large. Some operations in a typical network interface implementation are serialized. Examples of these operations include access to a control data structure such as a descriptor ring that is stored in main memory, access to packet data and access to a control data structure such as a completion ring that is stored in main memory. Known I/O architectures and protocols enforce strict ordering of application data.

In known computer systems there may be one or more contributors to the system latency. These contributors include memory technologies that do not correspond to processor and networking speeds. Also, known computer systems may be based on a non-uniform memory access (NUMA) architecture which increases latency if the data cannot be held in the memory of the local processor. In known network systems it is often difficult to control where data is stored.

Some known high end networking systems which include many processors can make the system latency issue worse. Often, an increase in computational scalability also increases the system memory access latency to unacceptable levels from a network perspective.

Many known system include at least one bridge or switch. This bridge or switch adds hardware latency due to protocol conversion or buffering. Additionally, some bridges or switches require software intervention to function properly.

Input output memory management units (IOMMUs) can also generate system latencies. For example, systems that use a virtual memory (VM) model often require virtual address to physical address translation in hardware. The translation tables are hardware limited. If an entry is evicted from the translation table, the latency penalty can be significant. This issue is typical for networking systems because it is often difficult to control to where information is stored.

SUMMARY OF THE INVENTION

In accordance with the present invention, a network system is set forth which addresses system latency issues by recognizing that a typical network system communicates with many destinations (via, e.g., multiple TCP connections), and that network traffic is bursty (i.e., multiple packets are sent at a time for a given connection). The network system in accordance with the present invention includes an I/O architecture and protocol which allows relaxed ordering. The network system includes a transmit method of requesting multiple packets and reordering interleaved partial completions. The network system includes a receive method that minimizes ordering constraints on the I/O path of the network system.

Additionally, the network system includes one or more of a plurality of features which address system latency issues. For example, in one embodiment, the present invention provides a method for moving data for each connection independently and in parallel to and from memory. When one channel stalls due to a memory latency, another channel takes over. Also for example, in one embodiment, multiple packets are moved at a time. Also for example, in one embodiment, a split transaction model is implemented; the split transaction model enforces strict ordering on a given connection only when necessary and otherwise uses relaxed ordering. Also for example, in one embodiment, the network system maximizes IOMMU locality, thereby reducing the probability of a translation table entry being evicted. Also for example, in one embodiment, the network system reduces bridge latency in certain applications.

Also for example, in one embodiment, the network system provides dedicated resources for each connection including independent DMA channels, data structures, FIFOs, etc. Also for example, in one embodiment, the network system requests multiple packets from the same and multiple connections; the network system includes multiple receive descriptor updates and receive mailbox completions. Also for example, in one embodiment, the network system includes a reorder mechanism. Also for example, in one embodiment, the network system provides large virtually contiguous portions including virtually contiguous regions for descriptors and large virtually contiguous consecutively posted sub-buffers.

In one embodiment, the invention relates to a method for maximizing page locality within a networking system operationally attached to a plurality of processing entities wherein each processing entity either shares or includes a corresponding memory hierarchy wherein each memory hierarchy has a table of pages temporally managed by access from the networking system. The method includes providing at least one memory access channel to each memory hierarchy and moving information to and from pages in the memory hierarchy of a particular processing entity via its associated memory access channels.

In another embodiment, the invention relates to an apparatus for maximizing page locality within a networking system operationally attached to a plurality of processing entities wherein each processing entity either shares or includes a corresponding memory hierarchy and each memory hierarchy has a table of pages temporally managed by access from the networking system. The apparatus includes at least one memory access channel corresponding to each memory hierarchy and means for moving information to and from pages in the memory hierarchy of a particular processing entity via its associated memory access channels.

In another embodiment, the invention relates to a network system which includes a network interface, a plurality of processing entities coupled to the network interface wherein each of the plurality of processing entities either shares or includes a corresponding memory hierarchy and each memory hierarchy has a table of pages temporally managed by access from a network interface, at least one memory access channel corresponding to each memory hierarchy and the network interface moves information to and from pages in the memory hierarchy of a particular processing entity via its associated memory access channels so as to maximize page locality within the network system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Network System Overview

Figure 1:
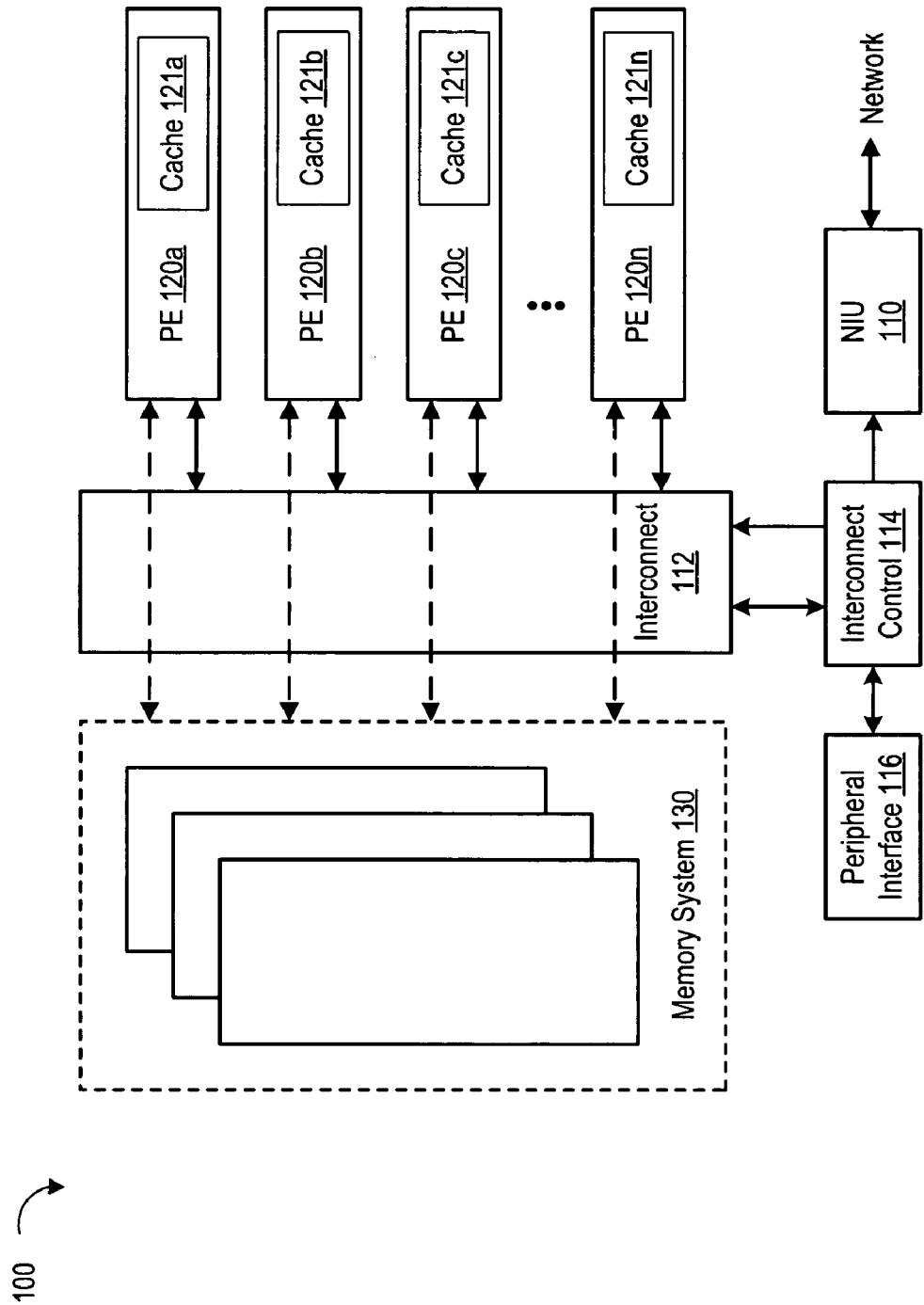
FIG. 1 shows a block diagram of a multiprocessor network system.

Referring to FIG. 1, a block diagram of a network system 100 is shown. More specifically, the network system 100 includes a network interface unit 110 which is coupled to an interconnect device 112 via an interconnect controller 114. The interconnect controller 114 is also coupled to a peripheral interface module 116. The interconnect device 112 is also coupled to a plurality of processing entities 120 and to memory system 130. The processing entities 120 are coupled to the memory system 130. Each processing entity 120 includes a respective cache 121.

The interconnect device 112 may be an input/output (I/O) bus (such as e.g., a PCI Express bus) along with a corresponding bus bridge, a crossbar switch or any other type of interconnect device. In one embodiment, the interconnect device 112 or a bus bridge within the interconnect device 112 may include an I/O memory management unit (IOMMU). The interconnect device 112 may be conceptualized as part of the interconnect in the processor coherency domain. The interconnect device 112 resides on the boundary between the coherent and the non-coherent domains of the network system 100.

Each processing entity 120 may be a processor, a group of processors, a processor core, a group of processor cores, a processor thread or a group of processor threads or any combination of processors, processor cores or processor threads. A single processor may include a plurality of processor cores and each processor core may include a plurality of processor threads. Accordingly, a single processor may include a plurality of processing entities 120. Each processing entity 120 also includes a corresponding memory hierarchy. The memory hierarchy includes, e.g., a first level cache (such as cache 121), a second level cache, etc. The memory hierarchy may also include a processor portion of a corresponding non-uniform memory architecture (NUMA) memory system.

The memory system 130 may include a plurality of individual memory devices such as a plurality of memory modules. Each individual memory module or a subset of the plurality of individual memory modules may be coupled to a respective processing entity 120. The memory system 130 may also include corresponding memory controllers as well as additional cache levels. So for example, if the processing entities 120 of the network system 100 each include a first level cache, then the memory system 130 might include one or more second level caches.

The network system 100 addresses system latency issues by recognizing that a typical network system communicates with many destinations (via, e.g., multiple TCP connections), and that network traffic is bursty (i.e., multiple packets are sent at a time for a given connection). The network system 100 includes an I/O architecture and protocol which allows relaxed ordering. The network system 100 includes a transmit method of requesting multiple packets and reordering interleaved partial completions. The network system 100 includes a receive method that minimizes ordering constraints on the I/O path of the network system.

Additionally, the network system 100 includes one or more of a plurality of features which address system latency issues. For example, the network system 100 moves data for each connection independently and in parallel to and from the memory system 130. When one channel stalls due to a memory latency, another channel takes over. Also for example, multiple packets are moved at a time. Also for example, a split transaction model is implemented; the split transaction model enforces strict ordering on a given connection only when necessary and otherwise uses relaxed ordering. Also for example, the network system 100 maximizes IOMMU locality, thereby reducing the probability of a translation table entry being evicted. Also for example, the network system 100 reduces bridge latency in certain applications.

Also for example, the network system 100 provides dedicated resources for each connection including independent DMA channels. Also for example, the network system requests multiple packets from the same and multiple connections; the network system 100 includes multiple receive descriptor updates and receive mailbox completions. Also for example, the network system includes a reorder mechanism. Also for example, in one embodiment, the network system provides large virtually contiguous portions including virtually contiguous regions for descriptors and large virtual contiguous consecutively posted sub-buffers.

In one embodiment, the network system maximizes page locality within a networking system operationally attached to a plurality of processing entities, each processing entity either sharing or including a corresponding memory hierarchy, each memory hierarchy having a table of pages temporally managed by access from the networking system. The network system provides at least one memory access channel to each memory hierarchy and moves information to and from pages in the memory hierarchy of a particular processing entity via its associated memory access channels.

The network system 100 may include one or more of a plurality of features relating to maximizing page locality. For example, the network system may classify information received by the network interface based upon a plurality of classification criteria and associate classification information with a memory hierarchy of a processing entity so as to maximize a probability that a page entry will be reused over multiple consecutive accesses. The table of pages may be located within a memory management unit supporting virtual address to physical address translation, the table of pages including a plurality of entry locations and maximizing page locality includes reducing a likelihood of a page table entry being evicted when the memory hierarchy of a particular processing entity is accessed. The network system 100 may discriminate between packets based on their size and pack multiple packets into large memory buffers based upon the size of the packet. The network system 100 may pack control structures into larger buffers to maximize the number of control structures sharing a single entry within the table of pages.

Asymmetrical Processing Architecture

The method and apparatus of the present invention is capable of implementing asymmetrical multi-processing wherein processing resources are partitioned for processes and flows. The partitions can be used to implement networking functions by using strands of a multi-stranded processor, or Chip Multi-Threaded Core Processor (CMT) to implement key low-level functions, protocols, selective off-loading, or even fixed-function appliance-like systems. Using the CMT architecture for offloading leverages the traditionally larger processor teams and the clock speed benefits possible with custom methodologies. It also makes it possible to leverage a high capacity memory-based communication instead of an I/O interface. On-chip bandwidth and the higher bandwidth per pin supports CMT inclusion of network interfaces and packet classification functionality.

Asymmetrical processing in the system of the present invention is based on selectively implementing, off-loading, or optimizing specific functions, protocols, or flows, while preserving the networking functionality already present within the operating system of the local server or remote participants. The network offloading can be viewed as granular slicing through the layers for specific flows, functions or applications. The "offload" category includes the set of networking functions performed either below the TCP/IP stack, or the selective application of networking functions vertically for a set of connections/applications. Examples of the offload category include: (a) bulk data movement (NFS client, RDMA, iSCSI); (b) packet overhead reduction; (c) zero copy (application posted buffer management); and (d) scalability and isolation (traffic spreading from a hardware classifier).

Figure 2:
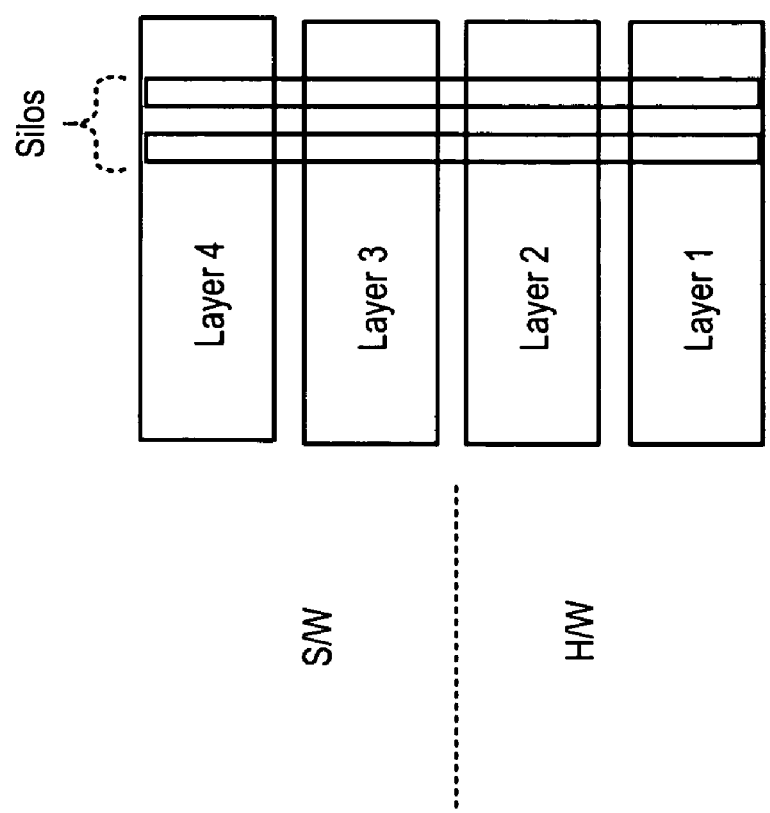
FIG. 2 shows a conceptual diagram of the asymmetrical processing functional layering of the present invention.

FIG. 2 shows the "layers" 1-4 of a traditional networking system that comprise the link, network, transport and application layers, respectively. A dashed line illustrates the delineation of networking functions that are traditionally handled by hardware vs. software. As shown in FIG. 2, in most networking systems this line of delineation is between layers 2 and 3.

Network functions in prior art systems are generally layered and computing resources are symmetrically shared by layers that are multiprocessor ready, underutilized by layers that are not multiprocessor ready, or not shared at all by layers that have coarse bindings to hardware resources. In some cases, the layers have different degrees of multiprocessor readiness, but generally they do not have the ability to be adapted for scaling in multiprocessor systems. Layered systems often have bottlenecks that prevent linear scaling.

In prior art systems, time slicing occurs across all of the layers, applications, and operating systems. Also, in prior art systems, low-level networking functions are interleaved, over time, in all of the elements. The present invention implements a method and apparatus that dedicates processing resources rather than utilizing those resources as time sliced. The dedicated resources are illustrated by the vertical columns in FIG. 2 that will sometimes be referred to herein as "silos."

The advantage of the asymmetrical model of the present invention is that it moves away from time slicing and moves toward "space slicing." In the present system, the processing entities are dedicated to implement a particular networking function, even if the dedication of these processing resources to a particular network function sometimes results in "wasting" the dedicated resource because it is unavailable to assist with some other function.

In the method and apparatus of the present invention, the allocation of processing entities (processor cores or individual strands) can be allocated with fine granularity. The "silos" that are defined in the architecture of the present invention are desirable for enhancing performance, correctness, or for security purposes.

Figure 3:
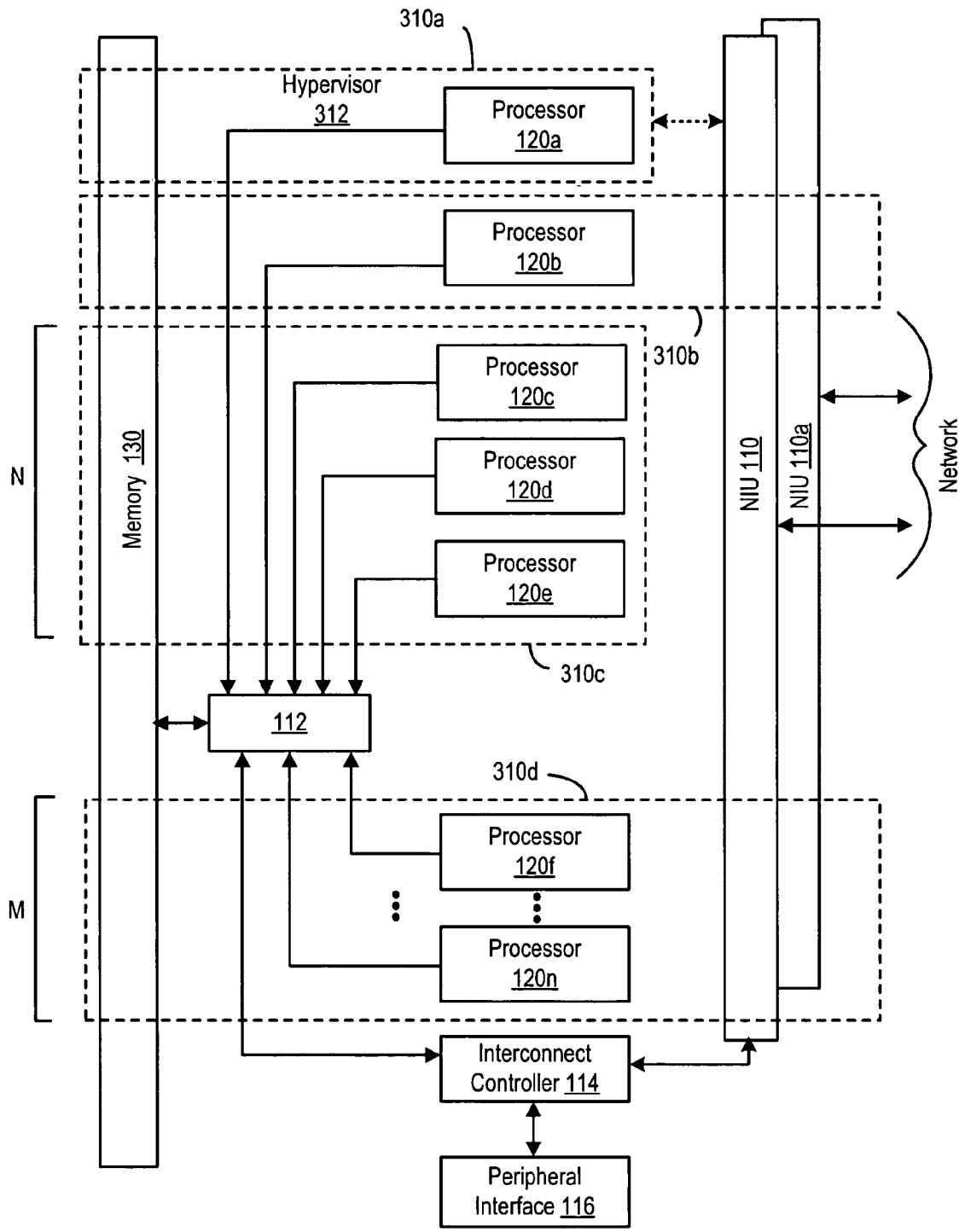
FIG. 3 shows a block diagram of the functional components of the asymmetrical processing architecture.

FIG. 3 is an illustration of a networking system that is partitioned whereby a plurality of processing entities are asymmetrically allocated to various networking functions. The functional associations of the processing entities 120*a-n* are illustrated by the dashed boundaries designated by reference numerals 310*a-d*. The functional association of processing entity 120*a* and memory system 130 designated by reference numeral 310*a* is a "hypervisor" that is responsible for managing the partitioning and association of the other processing entities, as will be described in greater detail hereinbelow.

Reference numeral 310*b* shows the association of a processing entity 120*b* with memory system 130 and a network interface unit resource of the network interface unit 110. Reference numeral 310*c* illustrates the association of a plurality of processing entities 120*c-e* with memory system 130 for performing a processing function that does not directly involve a network interface resource. Reference numeral 310*d* illustrates an association of a plurality of processing entities 120*f-n* with memory system 130 and one or more network interface resources of the network interface unit 110. As is discussed in greater detail herein, the various processing entities 120*a-n* can comprise an entire processor core or a processing strand of a processing core.

The hypervisor 312 manages the partitioning and association of the various processing entities with the memory system 130 and, in some instances, with a predetermined set of networking resources in the network interface unit. Thus the hypervisor 312 has the responsibility for configuring the control resources that will be dedicated to whichever processing entity is charged with responsibility for managing a particular view of the interface. For example, in the silo that is defined to include the M processing entities 120*f-n*, only those processing entities will have the ability to access a predetermined set of hardware resources relating to the interface. The control of the other processing entities, e.g., processing entities 120*c-e*, and the access to the memory system 130 for these processing entities is separated.

In the asymmetrical processing system illustrated in FIG. 3, the specific assignment and mapping of well defined subfunctions or sessions to preassigned processing entities is done to increase efficiency and throughput. Any number of processing entities can be assigned to a processing task that does not directly involve a network interface resource, such as the N processing entities 120*c-e*. Likewise, any number of processing entities can be assigned to perform a network functionality, protocol or hardware function, such as the M processing entities 120*f-n* illustrated in FIG. 3.

The present invention uses computer resources for network specific functions that could be low level or high level. High-level resources that are concentrated and implemented in the "silo" associations of the present invention are faster than a prior art general implementation of a symmetrical processing system. Using the asymmetrical processing system of the present invention, low-level functionality previously performed in hardware can be raised above the delineation line illustrated in FIG. 2. If there is a processing entity with a bottleneck, another processing entity, or strand, can become part of the flow or part of the function being executed in a particular "silo." In the asymmetrical system of the present invention, the processing entities that are associated with an interface or other functionality remain efficient because they continue to be associated with the shared memory resources. The processing entities 120a-n are dedicated without being physically moved within the various layers of the networking system.

FIG. 3 also shows two network interface instances 110. Each of the interfaces could have multiple links. The system of the present invention comprises aggregation and policy mechanisms which makes it possible to apply all of the control and the mapping of the processing entities 120a-120n to more than one physical interface.

In the asymmetrical processing system of the present invention, fine or coarse grain processing resource controls and memory separation can be used to achieve the desired partitioning. Furthermore it is possible to have a separate program image and operating system for each resource. Very "coarse" bindings can be used to partition a large number of processing entities (e.g., half and half), or fine granularity can be implemented wherein a single strand of a particular core can be used for a function or flow. The separation of the processing resources on this basis can be used to define partitions to allow simultaneous operation of various operating systems in a separated environment or it can be used to define two interfaces, but to specify that these two interfaces are linked to the same operating system.

Figure 4:
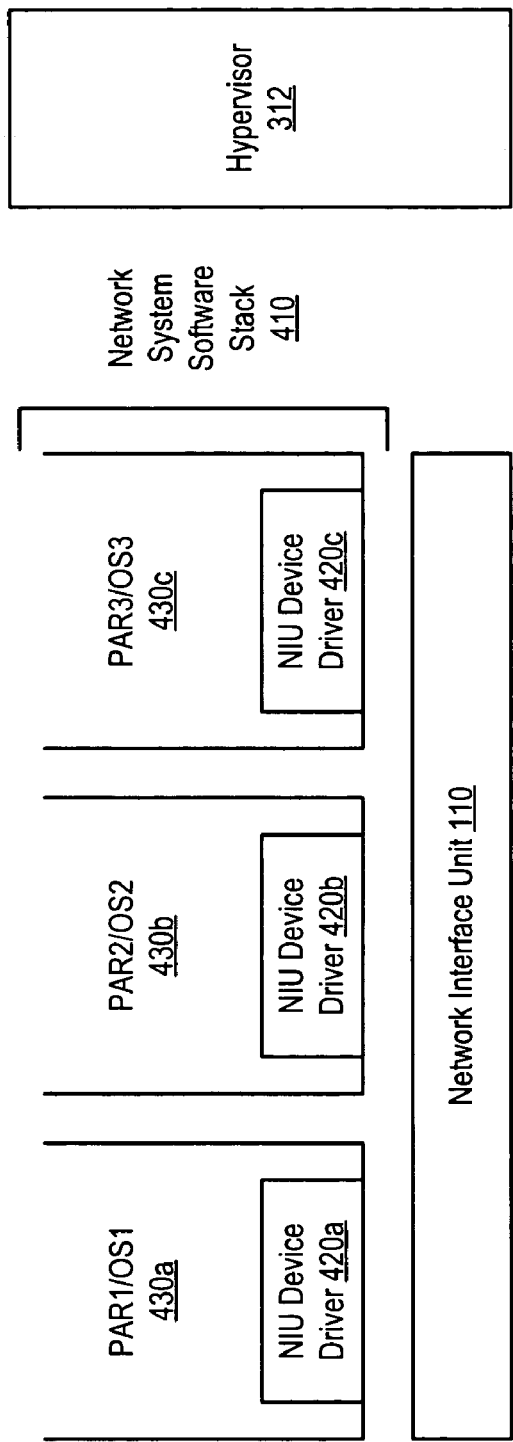
FIG. 4 shows a block diagram of a software view of the network system.

Referring to FIG. 4, a block diagram of a software view of the network system 100 is shown. More specifically, a network system software stack 410 includes one or more instantiations of a network interface unit device driver 420, the hypervisor 312, as well as one or more operating systems 430 (e.g., OS1, OS2, OS3). The network interface unit 110 interacts with the operating system 430 via a respective network interface unit device driver 420.

One of the processing entities may be configured to execute a partition management module (e.g., hypervisor 312). Hypervisor 312 is a high level firmware based function which performs a plurality of functions and services relating to the network system such as e.g., creating and enforcing the partitioning of a logically partitioned network system. Hypervisor 312 is a software implemented virtual machine. Thus, the network system 100, via hypervisor 312, allows the simultaneous execution of independent operating system images by virtualizing all the hardware resources of the network system 100. Each of the operating systems 430 interact with the network interface unit device driver 420 via extended partition portions of the hypervisor 312.

Figure 5A:
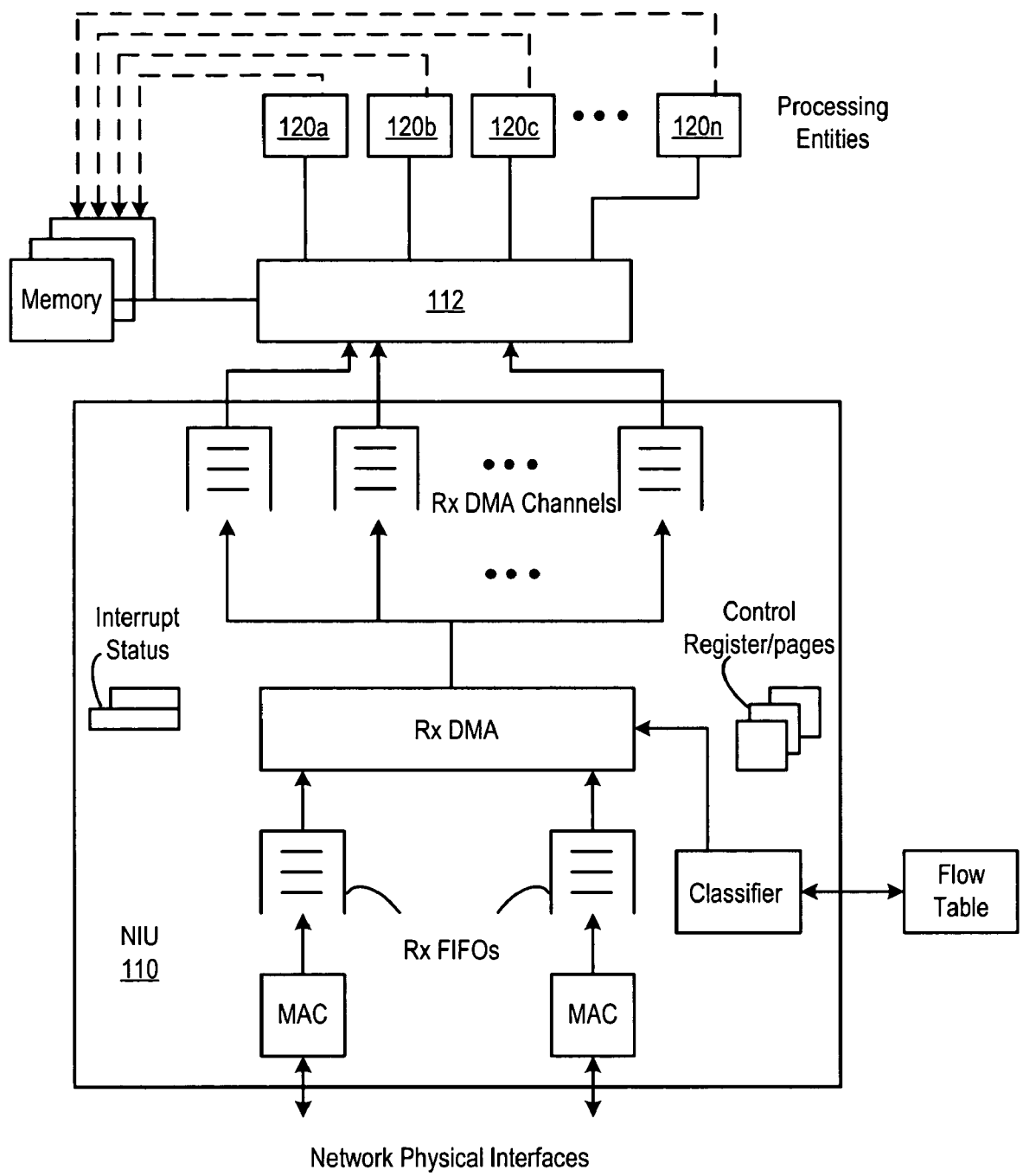
FIG. 5A shows a block diagram of the flow of packet data and associated control signals in the network system from the operational perspective of receiving incoming packet data.
Figure 5B:
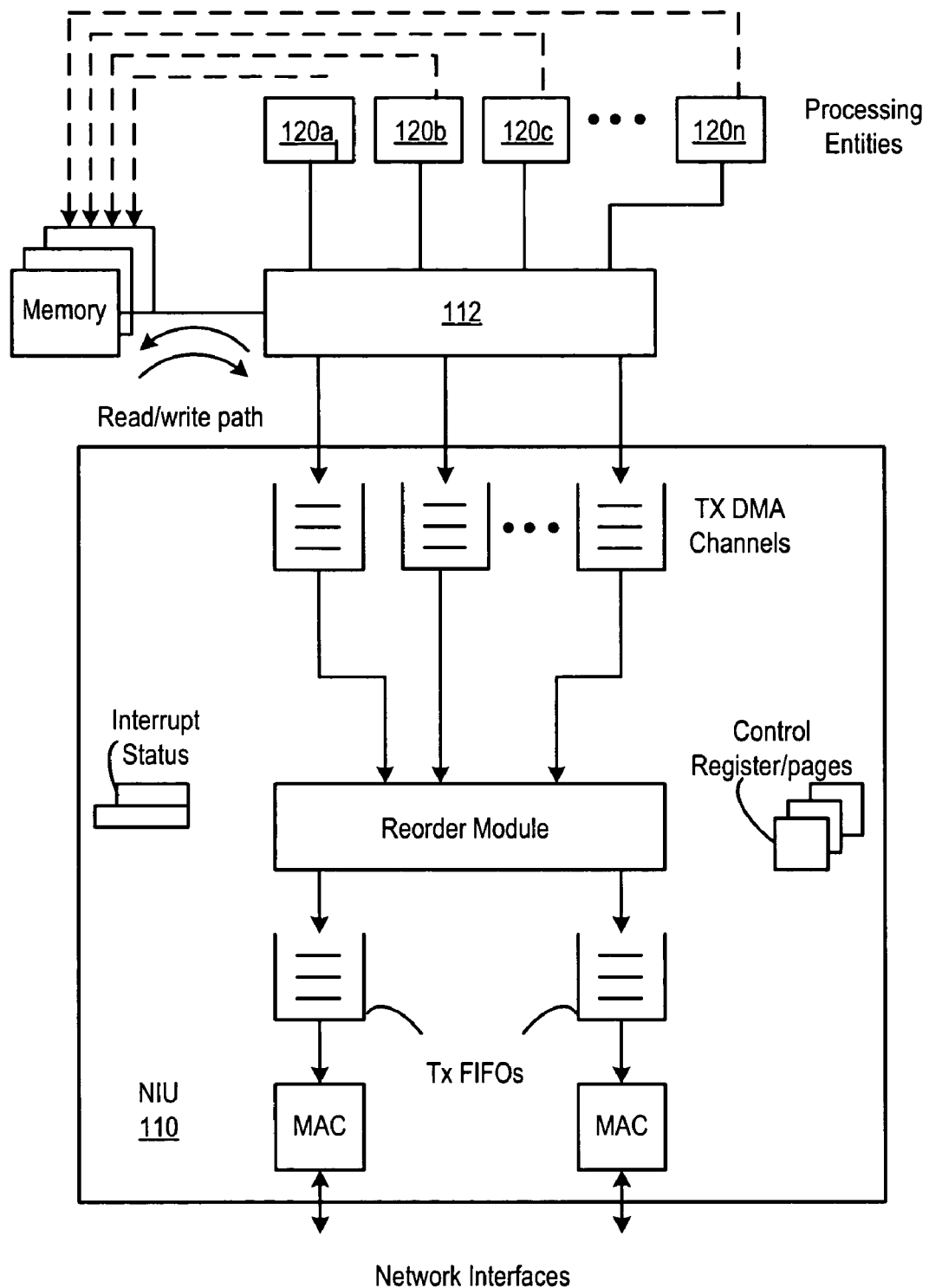
FIG. 5B shows a block diagram of the flow of packet data and associated control signals in the network system from the operational perspective of transmitting packet data.

FIGS. 5A and 5B are illustrations of the flow of packet data and associated control signals in the system of the present invention from the operational perspective of receiving incoming packet data and transmitting packet data, respectively. The network interface 110 is comprised of a plurality of physical network interfaces that provide data to a plurality of media access controllers (MACs). The MACs are operably connected to a classifier and a queuing layer comprising a plurality of queues. The classifier "steers" the flow of packet data in conjunction with a flow table, as described in more detail hereinbelow.

A mapping function based on the classification function performed by the classifier, and a receive DMA controller function are used to provide an ordered mapping of the packets into a merging module. The output of the merging module is a flow of packets into a plurality of receive DMA channels that are functionally illustrated as a plurality of queuing resources, where the number of receive DMA channels shown in FIG. 5A is independent of the number of physical interfaces providing inputs to the interface unit. Both data and "events" travel over the DMA channels. The queuing resources move the packet data to the shared memory.

As was discussed above, the queues also hold "events" and therefore, are used to transfer messages corresponding to interrupts. The main difference between data and events in the system of the present invention is that data is always consumed by memory, while events are directed to the processing entities.

Somewhere along the path between the network interface unit 110 and the destination processing entity, the events are translated into a "wake-up" signal. The classifier determines which of the processing entities will receive the interrupt corresponding to the processing of a packet of data. The classifier also determines where in the shared memory a data packet will be stored for further processing. The queues are isolated by the designation of DMA channels.

There are multiple instances of control registers (pages) in the network interface unit 110. The associations between the intended strands of the processing entities and the control registers are separable via the hypervisor 312 (see, e.g. FIG. 3). This is a logical relationship, rather than a physical relationship between the functional components of the interface unit. Aggregation and classification are accomplished by the two interfaces that share the classifier and also share the DMA channels. The classification function and the assignment of packets to DMA channels can be accomplished regardless of where the data packet originated. Fine and coarse grain are implemented by the flow table and the operation of the hypervisor to manage the receive DMA channels and the processing entities.

FIG. 5 B is an illustration of the flow of packet data and associated control signals from the operational perspective of transmitted packet data. Packets transmitted from the various processing entities 120a-120n are received by the interconnect 112 and are directed via plurality of transmit DMA channels. The transmit DMA channels generate a packet stream that is received by the reorder module. As will be described in greater detail hereinbelow, the reorder module is responsible for generating an ordered stream of packets and for providing a fan-out function. The output of the reorder module is a stream of packets that are stored in transmit dataI FIFOs. The packets in the transmit data FIFOs are received by the plurality of media access controllers and are thereafter passed to the network interfaces.

Figure 6:
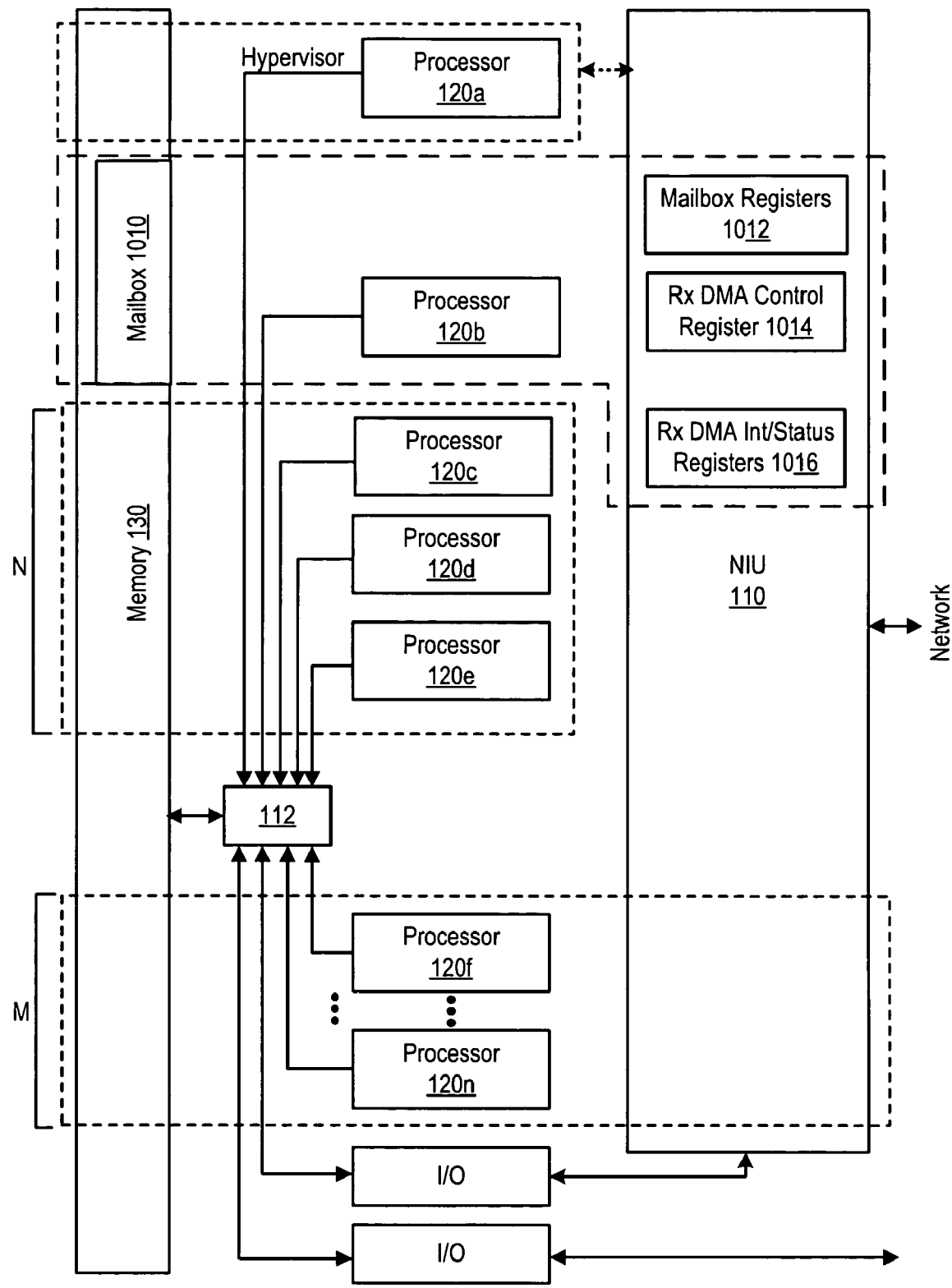
FIG. 6 shows a block diagram of an implementation of a mailbox image of an interrupt status register in the multiprocessor system.

FIG. 6 is an illustration of a mailbox and register-based interrupt event notification apparatus for separable, low overhead, scalable network interface service. In the shared memory environment of the asymmetrical processing system of the present invention, it is important to avoid physical interrupts, because it complicates management of the shared memory resources. In the present system "events" are messages that are essentially the same as memory writes. The "message" (or the "interrupt") is simply a means for waking up a specified processing entity; it does not contain information relating to why the processing entity is requested to wake up. When a request to wake up a processing entity is issued, it is also necessary to explain the nature of the task that the processing entity is requested to perform. This is typically accomplished by designating a receive DMA interrupt status register 1016 in the network interface unit 110 that contains information relating to the nature of the task to be performed. When the processing entity, e.g., processing entity 120*b*, is awakened, it will read the information in the interrupt status register that denotes the task to be performed. While the interrupt status register in the interface unit hardware provides accurate information relating to the state of the interrupt request, accessing of this information involves significant processing overhead and latency.

In the system of the present invention, data corresponding to the interrupt status that would normally be obtained from the Rx DMA interrupt status register 1016 in the network interface unit 110 is transferred into a "mailbox" 1010 in the shared memory 130. The shared memory mailbox is used to store an image of a corresponding interrupt register in the network interface unit 110. The image of the interrupt status register is stored in the shared memory mailbox just prior to sending a message to a processing entity asking it to wake up and perform a specified task. The processing entity that is requested to perform a specified task can access the information in the shared memory mailbox much more efficiently and quickly than it can obtain the information from the corresponding hardware register in the network interface.

It is possible, however, that the information in the hardware interrupt status register in the interface unit may change between the time the message is issued to a processing entity and the time the processing entity "wakes up" to perform the specified task. Therefore the data contained in the image of the interrupt storage register that is stored in the shared memory mailbox may not be the latest version.

By checking the information stored in the shared memory mailbox 1010, the processing entity can quickly determine the reason it was asked to wake up. It is very easy for the processing entity to consult the shared memory mailbox because of its close proximity to the processing entity. The purpose of the mailbox 1010 is to minimize the number of times that the processing entity must cross the I/O interface. The mailbox 1010 allows the processing entity 120*a* to postpone the time that it actually needs to read the contents of the interrupt status register in the interface unit.

Figure 7:
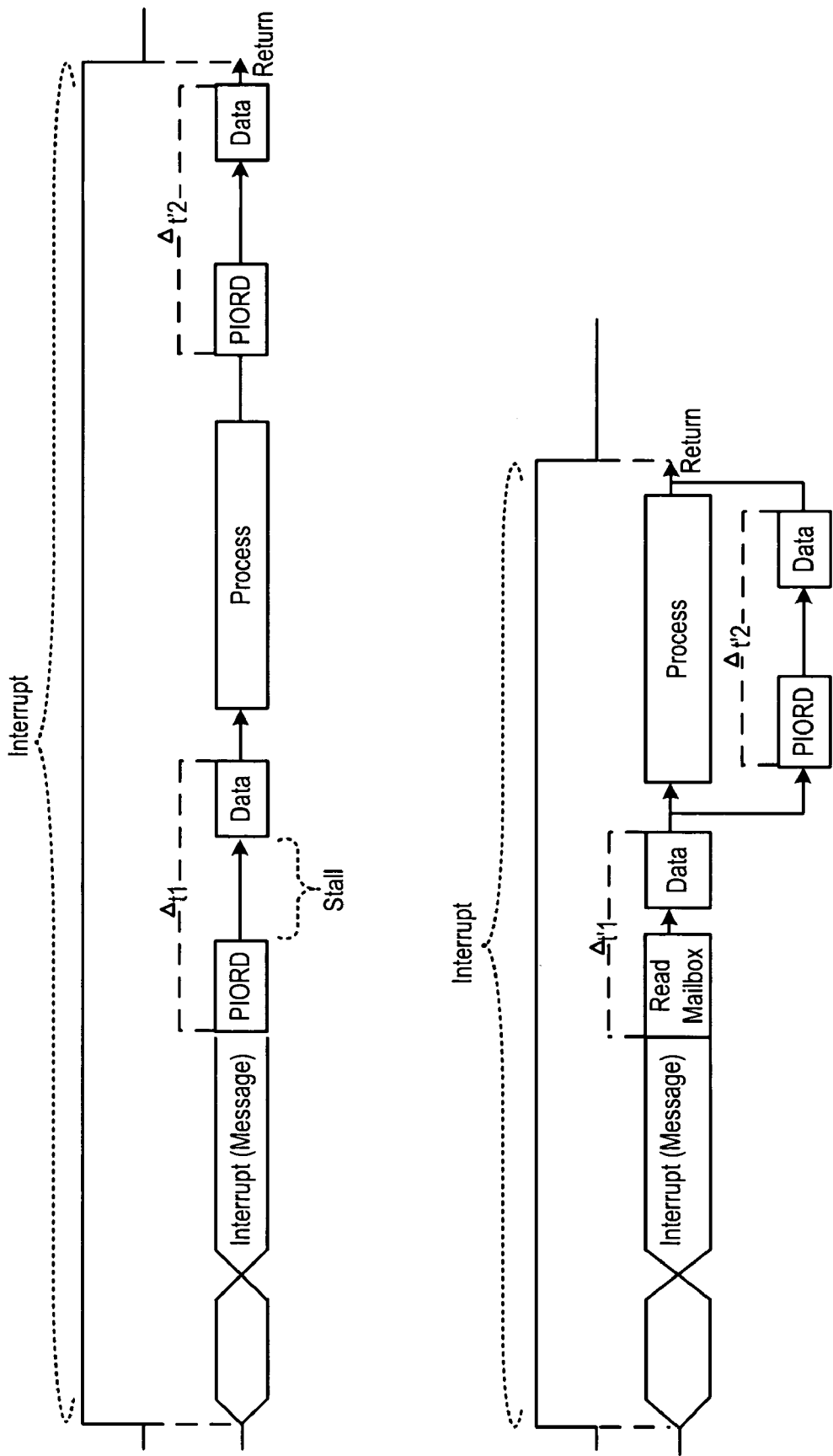
FIG. 7 shows a diagram of the timing sequence for an interrupt service routine utilizing the mailbox configuration.

The advantages relating to the shared memory mailbox implementation of the present invention can be seen by referring to FIG. 7. In a conventional system wherein the processing entity must rely entirely on an interrupt status register, the sequence of processing steps during the interrupt "high" signal is illustrated generally. The system executes an interrupt service routine wherein the interrupt is decoded to identify a particular process to be executed. The processing entity then executes a PIO read (PIORD) to retrieve data from the interrupt status register. There is a latency, illustrated by Δt1 and a related stall, associated with the time it takes the load from the interrupt status register to complete. The data obtained from the interrupt status register is used by the processing entity to perform actions corresponding to the information contained in the interrupt status register. After the actions associated with the original read of the interrupt status register are completed, a subsequent PIORD is issued to determine if the interrupt status register contains data corresponding to additional actions that must be executed. This subsequent PIORD has a corresponding latency Δt2 that results in a second stall. If the result of the subsequent PIORD indicates that the data previously obtained from the interrupt status register is the most current information, the processing entity responds with a return (RET) and the interrupt is terminated. As can be seen in FIG. 7, the interrupt processing sequence for an interrupt corresponding to a single process results in a minimum of two accesses to the interrupt register and a significant memory access latency for servicing the interrupt.

The interrupt service routine implemented using the shared memory mailbox of the present invention is illustrated generally by the lower timing diagram in FIG. 7. In the present invention, the processing entity accesses the image of the interrupt register in the shared memory mailbox, rather than executing a PIORD. This provides much faster access to the data and, therefore, significantly decreases the overall latency for the interrupt service routine. The present invention also decreases the overall latency of the interrupt service routine by initiating a subsequent PIORD while the process is being executed. The subsequent PIORD is executed on an interleaved basis while the processing entity is executing the process and the contents of the actual interrupt status register can be verified to determine if additional actions have been added to the interrupt request subsequent to storing the contents of the interrupt status register in the shared memory mailbox. In essence, therefore, in the present invention, the subsequent PIORD can be "prefetched" by interleaving it with the processing, thereby allowing the status of the actual interrupt status register to be verified immediately upon completion of the process resulting in an overall significantly shorter time for the system to process the interrupt service routine.

Network Interface Unit Overview

Figure 8:
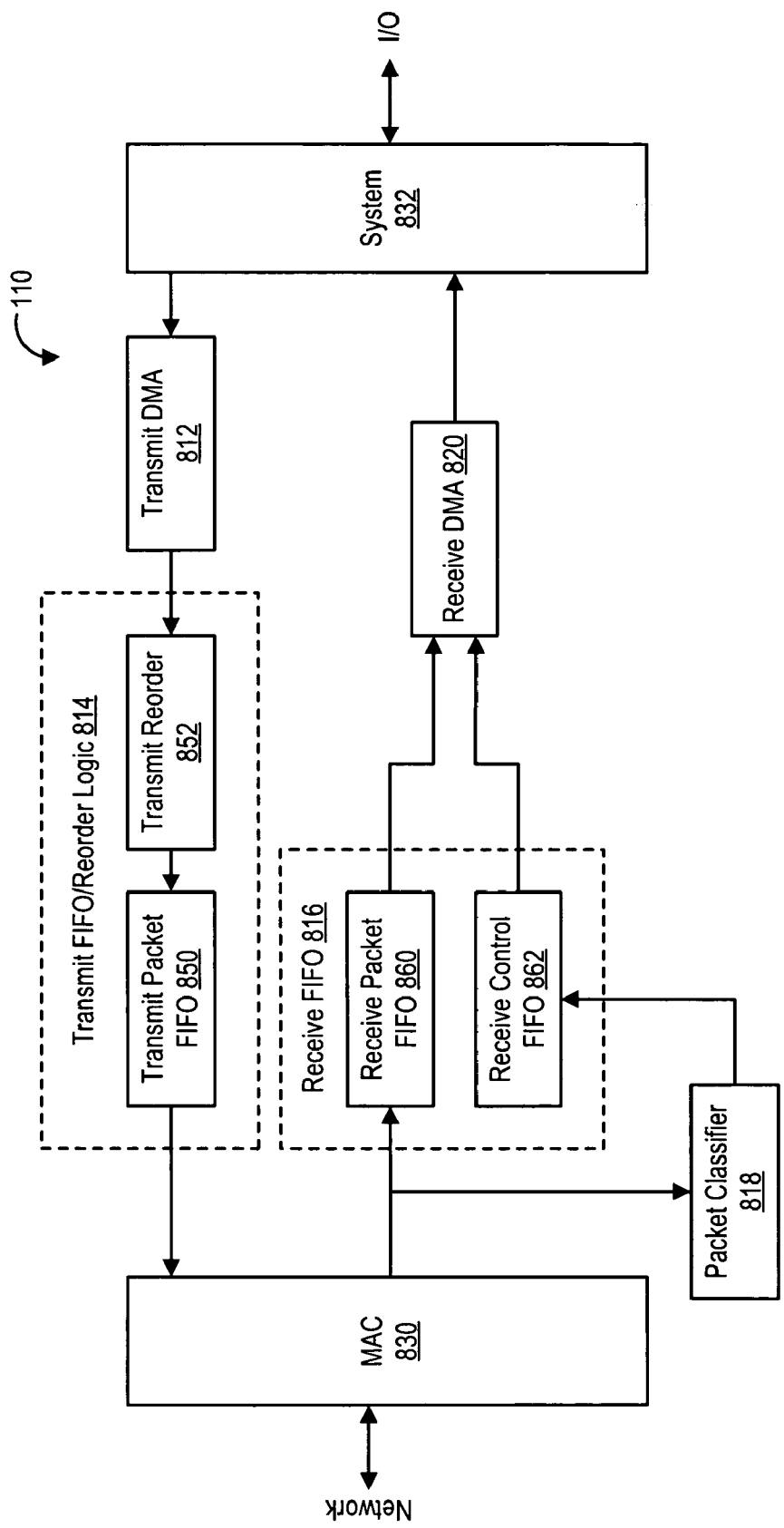
FIG. 8 shows a block diagram of a network interface unit.

Referring to FIG. 8, a block diagram of a network interface unit 110 is shown. The network interface unit 110 includes a transmit DMA module 812, a transmit FIFO/reorder logic module 814, a receive FIFO module 816, a receive packet classifier module 818, and a receive DMA module 820. The network interface unit 110 also includes a media access control (MAC) module 830 and a system interface module 832. The transmit packet FIFO reorder logic module 814 includes a transmit packet FIFO 850 and a transmit reorder module 852. The receive FIFO module 816 includes a receive packet FIFO 860 and a receive control FIFO 862.

Each of the modules within the network interface unit 110 include respective programmable input/output (PIO) registers. The PIO registers are distributed among the modules of the network interface unit 110 to control respective modules. The PIO registers are where memory mapped I/O loads and stores to control and status registers (CSRs) are dispatched to different functional units.

The system interface module 832 provides the interface to the interconnect device 112 and ultimately to the memory system 130.

The MAC module 830 provides a network connection such as an Ethernet controller. The MAC module 830 supports a link protocol and statistics collection.

Packets received by the MAC module 830 are first classified based upon the packet header information via the packet classifier 818. The classification determines the receive DMA channel within the receive DMA module 820. Transmit packets are posted to a transmit DMA channel within the transmit DMA module 812. Each packet may include a gather list. The network interface unit 110 supports checksum and CRC-32c offload on both receive and transmit data paths via the receive FIFO module 816 and the transmit FIFO reorder logic module 814, respectively.

The network interface unit 110 provides support for partitioning. For functional blocks that are physically associated with a network port (such as MAC registers within the MAC module 830) or logical devices such as receive and transmit DMA channels within the receive DMA module

820 and the transmit DMA module 812, respectively. Control registers are grouped into separate physical pages so that a partition manager (or hypervisor) can manage the functional blocks through a memory management unit on the processor side of the network system to provide an operating system (potentially multiple operating systems) direct access to the control registers. Control registers of shared logical blocks such as the packet classifier module 818, though grouped into one or more physical pages, may be managed solely by a partition manager (or hypervisor).

Each DMA channel can be viewed as belonging to a partition. The CSRs of multiple DMA channels can be grouped into a virtual page to simplify management of the DMA channels.

Each transmit DMA channel or receive DMA channel can perform range checking and relocation for addresses residing in multiple programmable ranges. The addresses in the configuration registers, packet gather list pointers on the transmit side and the allocated buffer pointer on the receive side are then checked and relocated accordingly.

The network interface unit 110 supports sharing available system interrupts. The number of system interrupts may be less than the number of logical devices. A system interrupt is an interrupt that is sent to a processing entity 120. A logical device refers to a functional block that may ultimately cause an interrupt.

A logical device may be a transmit DMA channel, a receive DMA channel, a MAC device or other system level module. One or more logical conditions may be defined by a logical device. A logical device may have up to two groups of logical conditions. Each group of logical conditions includes a summary flag, also referred to as a logical device flag (LDF). Depending on the logical conditions captured by the group, the logical device flag may be level sensitive or may be edge triggered. An unmasked logical condition, when true, may trigger an interrupt.

Logical devices are grouped into logical device groups. A logical device group is a set of logical devices sharing an interrupt. A group may have one or more logical devices. The state of the logical devices that are part of a logical device group may be read by software.

Not all logical devices belonging to a group trigger an interrupt. Whether or not a logical device can trigger an interrupt is controlled by a logical device group interrupt mask (LDGIM). The logical device group interrupt mask is a per logical device group mask that defines which logical device within the group, when a logical condition (LC) becomes true, can issue an interrupt. The logical condition is a condition that when true can trigger an interrupt. A logical condition may be a level, (i.e., the condition is constantly being evaluated) or may be an edge (i.e., a state is maintained when the condition first occurs, this state is cleared to enable detection of a next occurrence of the condition).

One example of a logical device that belongs to a group but does not generate an interrupt is a transmit DMA channel which is part of a logical device group. Software may examine the flags associated with the transmit DMA channel by setting the logical device group number of the logical device. However, the transmit DMA channel will not trigger an interrupt if the corresponding bit of the interrupt mask is not set.

A system interrupt control value is associated with a logical device group. The system interrupt control value includes an arm bit, a timer and system interrupt data. System interrupt data is the data associated with the system interrupt and is sent along with the system interrupt. The system interrupt control value is set by a partition manager or a hypervisor. A device driver of the network interface unit 110 writes to a register to set the arm bit and set the value of the timer. Hardware causes the timer to start counting down. A system interrupt is only issued if the timer is expired, the arm bit is set and one or more logical devices in a logical device group have their flags set and not masked. This system interrupt timer value ensures that there is some minimal separation between interrupt requests.

Software clears the state or adjusts the conditions of individual Logical Devices after servicing. Additionally, software enables a mailbox update of the Logical Device if desired. In one embodiment, hardware does not support any aggregate updates applied to an entire logical device group.

With one embodiment of the integrated network interface unit 110, the system interrupt data is provided to a non cacheable unit to lookup the hardware thread and interrupt number. With another embodiment of the network interface unit 110, some higher order bits of the system interrupt data are used to select a PCI function and the other bits of the logical device group ID are passed as part of the message signal interrupt (MSI) data, depending on the range value.

For one embodiment of the network interface unit 110, a PCI-Express or HyperTransport (HT) module supports a system interrupt data to message signal interrupt (MSI) lookup unit. Thus, the MSI lookup unit provides a synchronization point. Before an interrupt is issued across the interconnect 112, the network interface unit 110 looks up the MSI address and the MSI data. A posted write to the MSI address with the MSI data is issued. This is always an ordered request. A datapath interface is the interface to the specific interconnect.

A FIFO queues up requests from processing entities 120. Requests are read one by one and dispatched to the different functional units of the network interface unit 110. Write requests are dispatched to the functional unit if the function can accept the request. Before a read request is issued, all prior requests (either read requests or write requests) are acknowledged.

Another embodiment of the integrated network interface unit 110 system interface supports cache line size transfers. Logically, there are two classes of requests, ordered requests and bypass requests. The two classes of requests are queued separately in the system interface unit 832. An ordered request is not issued to the memory system 130 until "older" ordered and bypass requests are completed. However, acknowledgements may return out of order. Bypass requests may be issued as long as the memory system 130 can accept the request and may overtake "older" ordered requests that are enqueued or in transit to the memory system 130. Packet data transfers both receive and transmit, are submitted as bypass requests. Control data requests that affect the state of the DMA channels are submitted as ordered requests. Additionally, write requests can be posted and no acknowledgement is returned.

In the other embodiment of the integrated network interface unit 110, a non cacheable unit is a focal point where PIO requests are dispatched to the network interface unit 110 and where the PIO information read returns and interrupts are processed. The non cacheable unit serializes the PIOs from different processor threads to the network interface unit 110. The non cacheable unit also includes an internal table where, based on the System Interrupt Data, the non cacheable unit looks up the processor thread number and the interrupt number used.

Figure 9A:
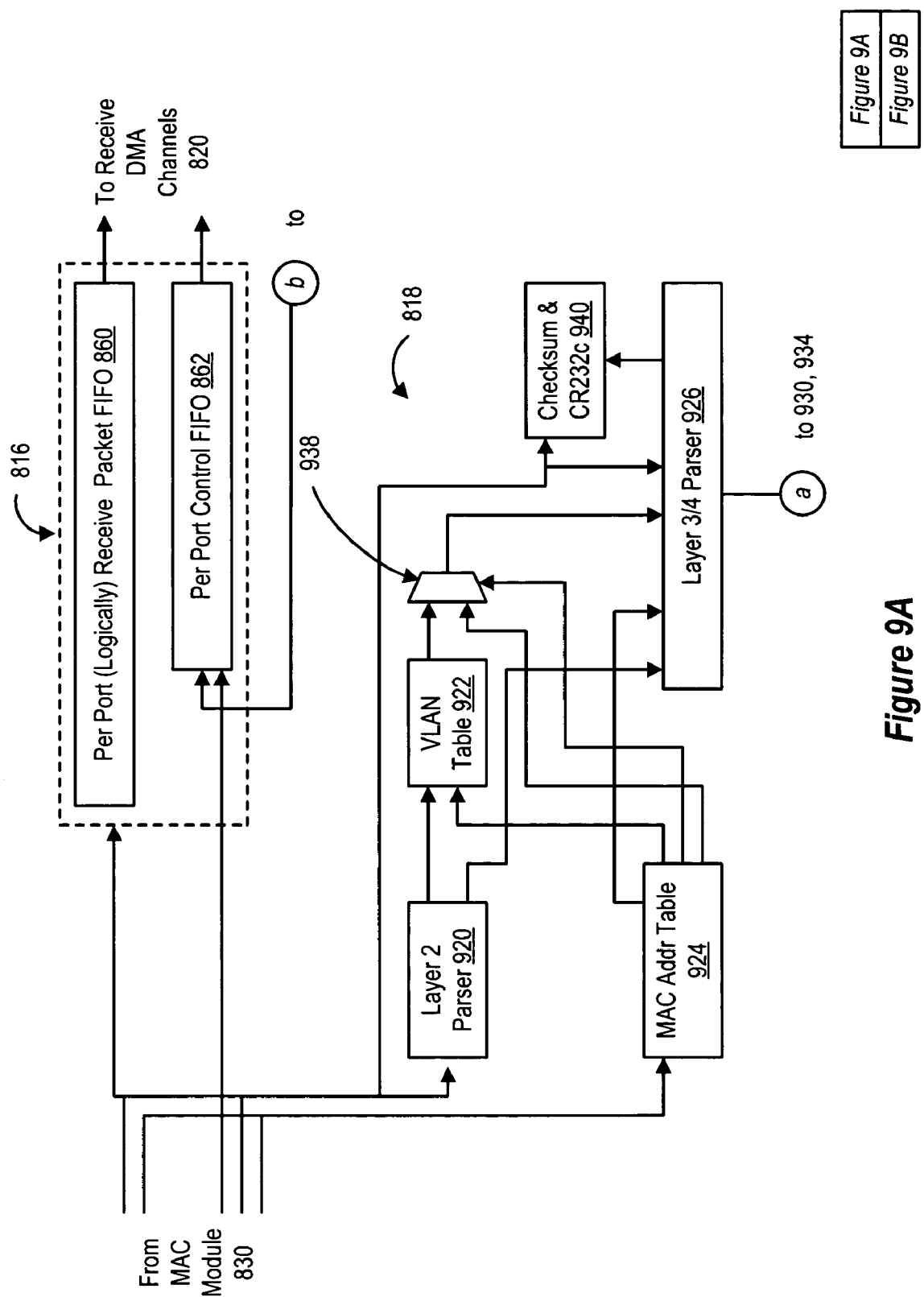
FIGS. 9A and 9B, generally referred to as FIG. 9, show a block diagram of a receive packet FIFO module and a packet classifier module.
Figure 9B:
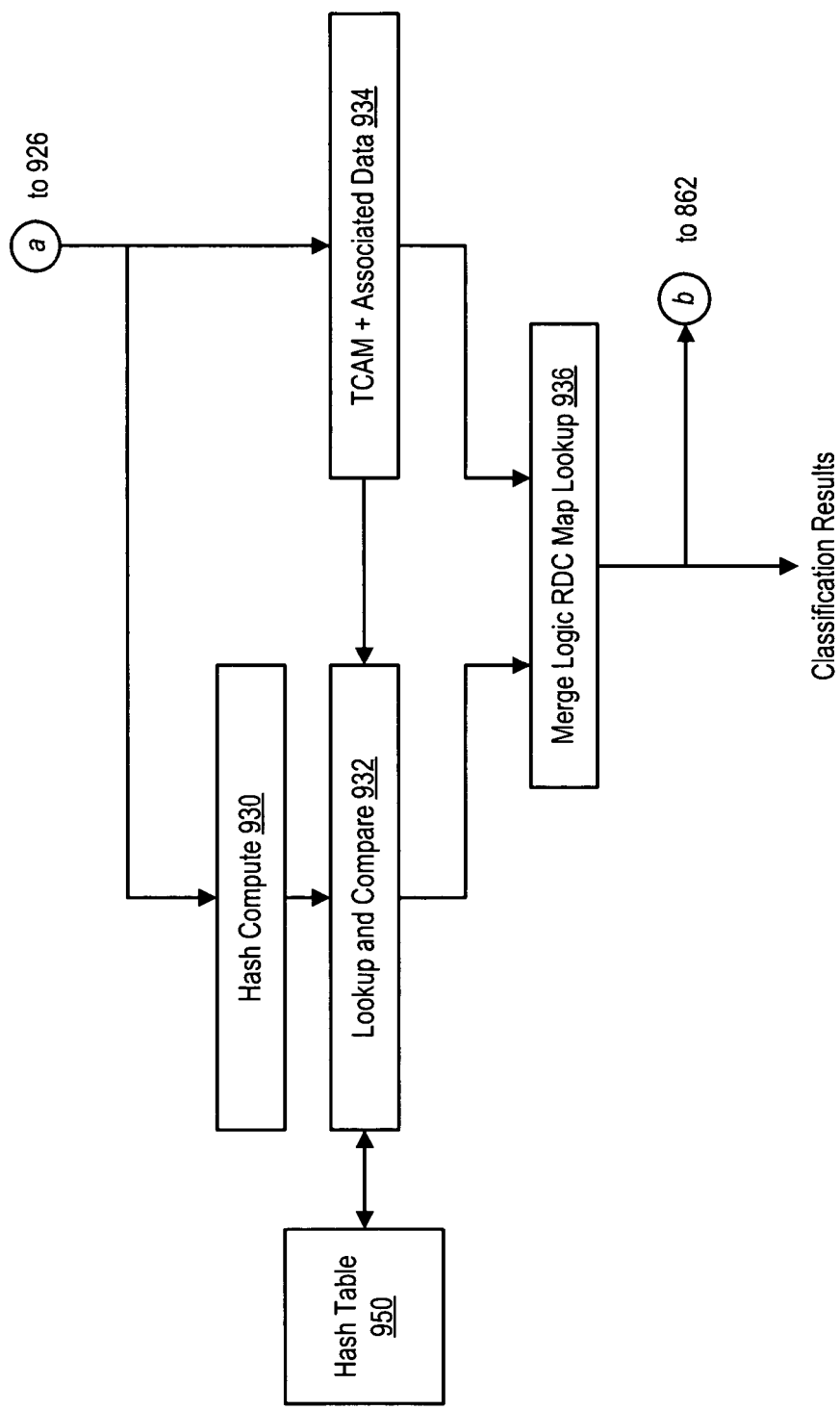

Referring to FIGS. 9A and 9B, a block diagram of the receive FIFO module 816 and the packet classifier module

818 is shown. The receive FIFO module 816 is coupled to the MAC module 830 and the receive DMA module 820 as well as to the packet classifier module 818. The packet classifier module 818 is coupled to the MAC module 830 and the receive FIFO module 816.

The receive FIFO module 816 includes a per port receive packet FIFO 860 and a per port control FIFO 862. For example, if the network interface unit 110 includes two network ports, then the per port receive packet FIFO 860 includes two corresponding FIFO buffers, if the network interface unit 110 includes four network ports, then the per port receive packet FIFO 860 includes four FIFO buffers. Similarly, if the network interface unit 110 includes two network ports, then the per port control FIFO 860 includes two corresponding control FIFO buffers, if the network interface unit 110 includes four network ports, then the per port control FIFO 860 includes four control FIFO buffers.

The packet classifier module 818 includes a Layer 2 parser 920, a virtual local area network (VLAN) table 922, a MAC address table 924, a layer 3 and 4 parser 926, a hash compute module 930, a lookup and compare module 932, a TCAM and associated data module 934 and a merge logic receive DMA channel (RDC) map lookup module 936. The packet classifier module 818 also includes a receive DMA channel multiplexer module 938. The packet classifier module 818 also includes a checksum module 940. The packet classifier module 818, and specifically, the lookup and compare module 932, is coupled to a hash table 950.

Figure 10:
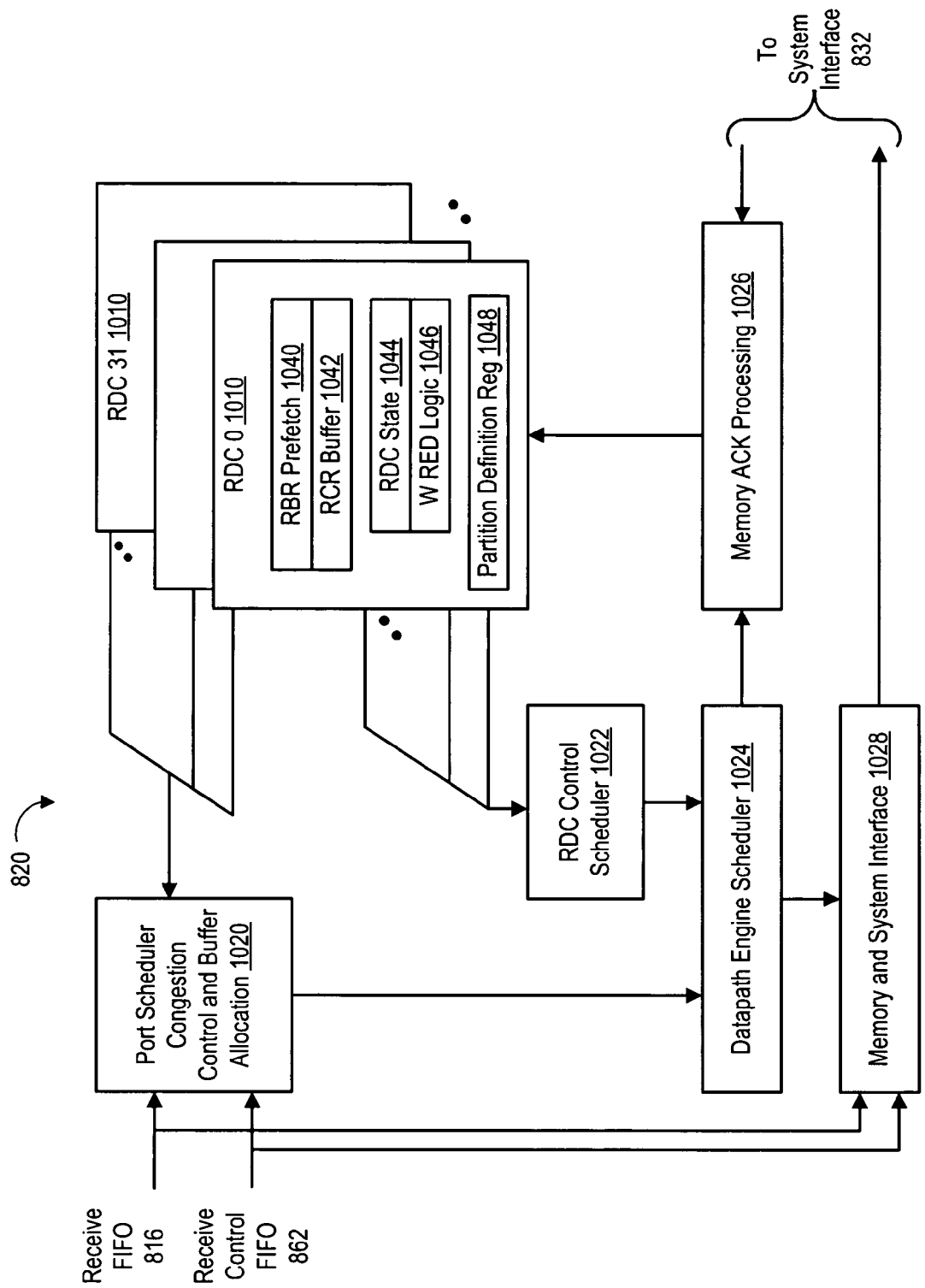
FIG. 10 shows a schematic block diagram of a receive DMA module.

Referring to FIG. 10, a block diagram of the receive DMA module 820 is shown. The receive DMA module 820 includes a plurality of receive DMA channels 1010, e.g., receive DMA channel 0-receive DMA channel 31. The receive DMA module 820 also includes a port scheduler module 1020, a receive DMA control scheduler module 1022, a datapath engine module 1024, a memory acknowledgement (ACK) processing module 1026 and a memory and system interface module 1028.

The plurality of DMA channels 1010 are coupled to the port scheduler module 1020 as well as the receive DMA channel control scheduler 1022 and the memory ACK processing module 1026. The port scheduler module 1020 is coupled to the receive packet FIFO 860 and the receive control FIFO 862 as well as to the datapath engine scheduler module 1024. The datapath engine scheduler 1024 is coupled to the port scheduler module 1020, the receive DMA channel control scheduler 1022 as well as to the memory acknowledgement processing module 1026 and the memory and system interface module 1028. The memory and system interface module 1028 is coupled to the receive packet FIFO 860 and the receive control FIFO 862 as well as to the datapath engine scheduler module 1024 and to the system interface module 832. The memory ACK processing module 1026 is coupled to the plurality of DMA channels 1010 as well as to the datapath engine scheduler 1024 and the system interface module 832.

Each of the plurality of receive DMA channels 1010 includes a receive block ring (RBR) prefetch module 1040, a receive completion ring (RCR) Buffer module 1042, a receive DMA channel state module 1044, a weighted random early discard WRED logic module 1046 and a partition definition register module 1048.

Figure 11:
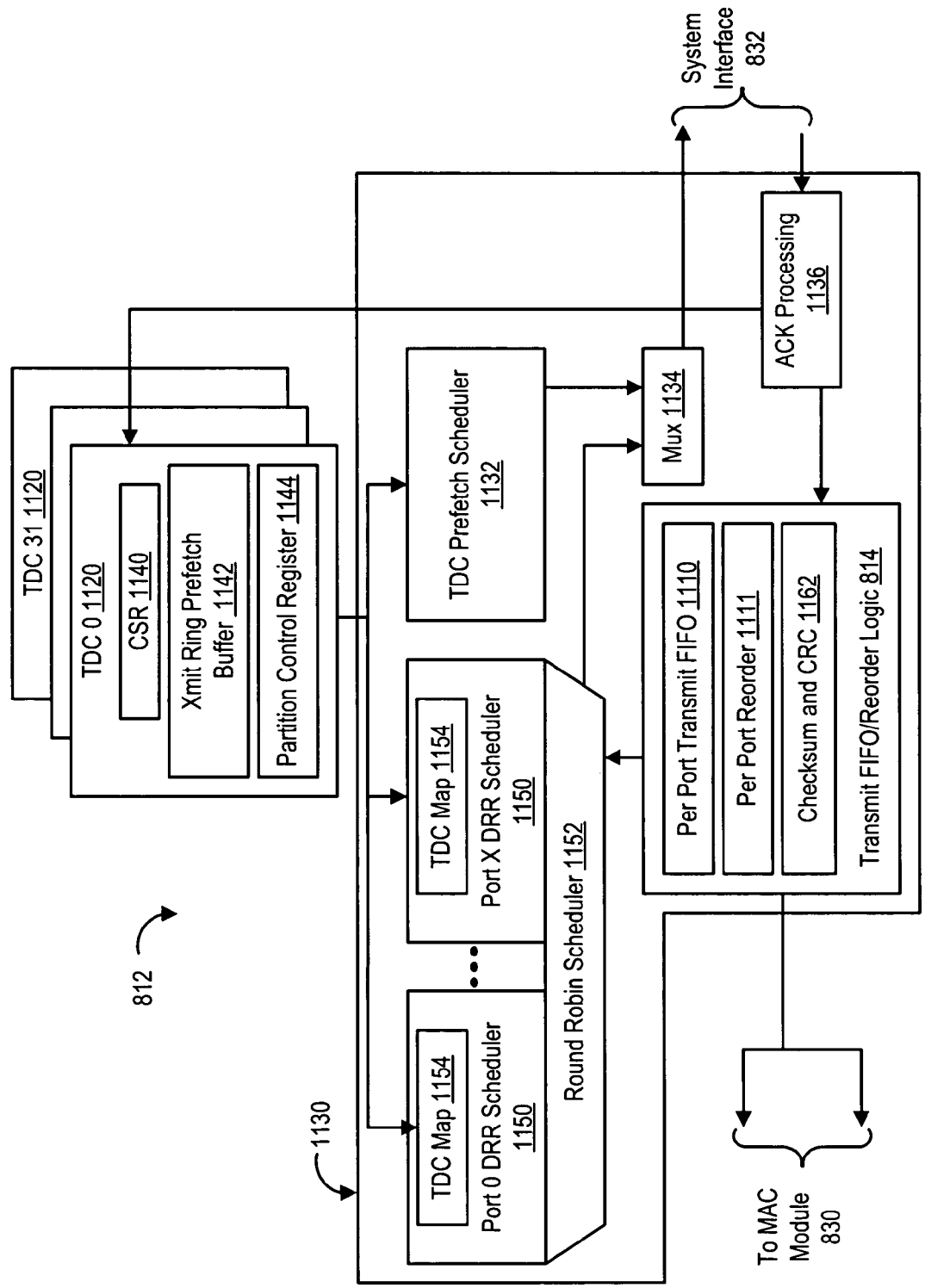
FIG. 11 shows a schematic block diagram of a transmit DMA module and a transmit FIFO/reorder logic module.

Referring to FIG. 11, a block diagram of the transmit DMA module 812 and transmit FIFO/reorder logic module 814 is shown. The transmit DMA module 812 is coupled to the system interface module 832 as well as to the transmit FIFO/reorder logic module 814. The transmit FIFO/reorder module 814 is coupled to the system interface module 832 as well as to the transmit DMA module 812.

The transmit FIFO/reorder logic module 814 includes per port transmit FIFO 1110 and a per port reorder module 1111 as well as a checksum and CRC module 1162. The per port transmit FIFO 1110 and the per port reorder module 1111 each include logic and buffers which correspond to the number of network ports within the network interface unit 110. For example, if the network interface unit 110 includes two network ports, then the module includes two per port reorder modules and the transmit FIFO 1110 includes two FIFO buffers, if the network interface unit 110 includes four network ports, then the per port reorder module includes four per port reorder modules and the transmit FIFO 1110 includes four FIFO buffers.

The transmit DMA module 812 includes a plurality of transmit DMA channels 1120, e.g., transmit DMA channel 0-transmit DMA channel 31. The transmit DMA module 812 also includes a scheduler module 1130, a transmit DMA channel prefetch scheduler 1132, a multiplexer 1134, and an acknowledgement (ACK) processing module 1136.

Each transmit DMA channel 1120 includes a control state register portion 1140, a transmit ring prefetch buffer 1142 and a partition control register 1144. The control state register portion 1140 includes a plurality of control state registers which are associated with the PIO registers and which control an individual transmit DMA channel 1120.

The scheduler module 1130 includes per port deficit round robin (DRR) scheduler modules 1150 as well as a round robin scheduler module 1152. The per port scheduler modules 1150 correspond to the number of network ports within the network interface unit 110. For example, if the network interface unit 110 includes two network ports, then the scheduler module 1130 includes two per port DRR scheduler modules 1150 (port 0 DRR scheduler module and port 1 DRR scheduler module), if the network interface unit 110 includes four network ports, then the scheduler module 1130 includes four per port DRR scheduler modules 1150 (port 0 DRR scheduler module through port 3 DRR scheduler module). Each per port DRR scheduler module 1150 includes a transmit DMA channel map module 1154.

The Transmit FIFO reorder logic module 814 includes a per port reorder module 1111 and a per port transmit FIFO 1110 and a checksum and CRC module 1162. The per port transmit FIFO 1160 includes FIFO buffers which correspond to the number of network ports within the network interface unit 110. For example, if the network interface unit 110 includes two network ports, then the per port transmit FIFO 1110 includes two per port transmit FIFO buffers, if the network interface unit 110 includes four network ports, then the per port transmit FIFO 1110 includes four per port transmit FIFO buffers.

Figure 12:
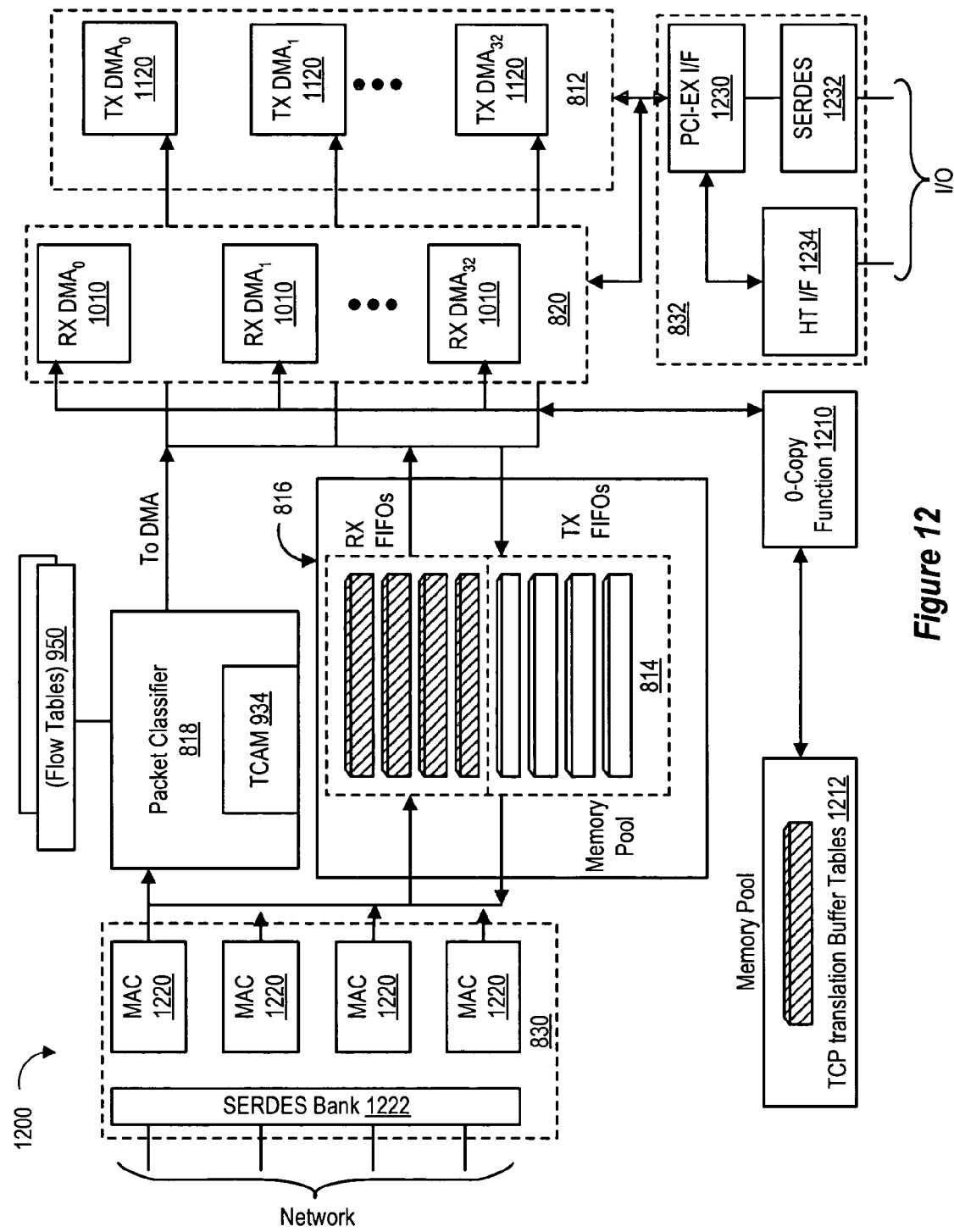
FIG. 12 shows a schematic block diagram of an example of a four port network interface unit.

Referring to FIG. 12, a schematic block diagram of an example of a four port network interface unit 1200 is shown. The four port network interface unit 1200 includes a transmit DMA module 812, a transmit FIFO reorder logic module 814, a receive FIFO module 816, a receive packet classifier module 818, and a receive DMA module 820. The four port network interface unit 1200 also includes a media access control (MAC) module 830 and a system interface module 832. The four port network interface unit 1200 also includes a zero copy function module 1210 which is coupled to a TCP translation buffer table module 1212.

The packet classifier module 818 includes a corresponding ternary content addressable memory (TCAM) module 934. The packet classifier module 818 is coupled to an FC RAM module 950 which stores flow tables for use by the packet classifier module 818.

The receive DMA module 820 includes 32 receive DMA channels 1010. The transmit DMA module 812 includes 32 transmit DMA channels 1120. The MAC module 830 includes four MAC ports 1220 as well as a serializer/deserializer (SERDES) bank module 1222. Because there are four MAC ports 1220, the per port receive packet FIFOs 816 include four corresponding receive packet FIFOs and the per port transmit FIFOs 814 include four corresponding transmit FIFOs. The system interface module 832 includes a PCI Express interface module 1230, a system interface SERDES module 1232 and a HT interface module 1234.

Figure 13:
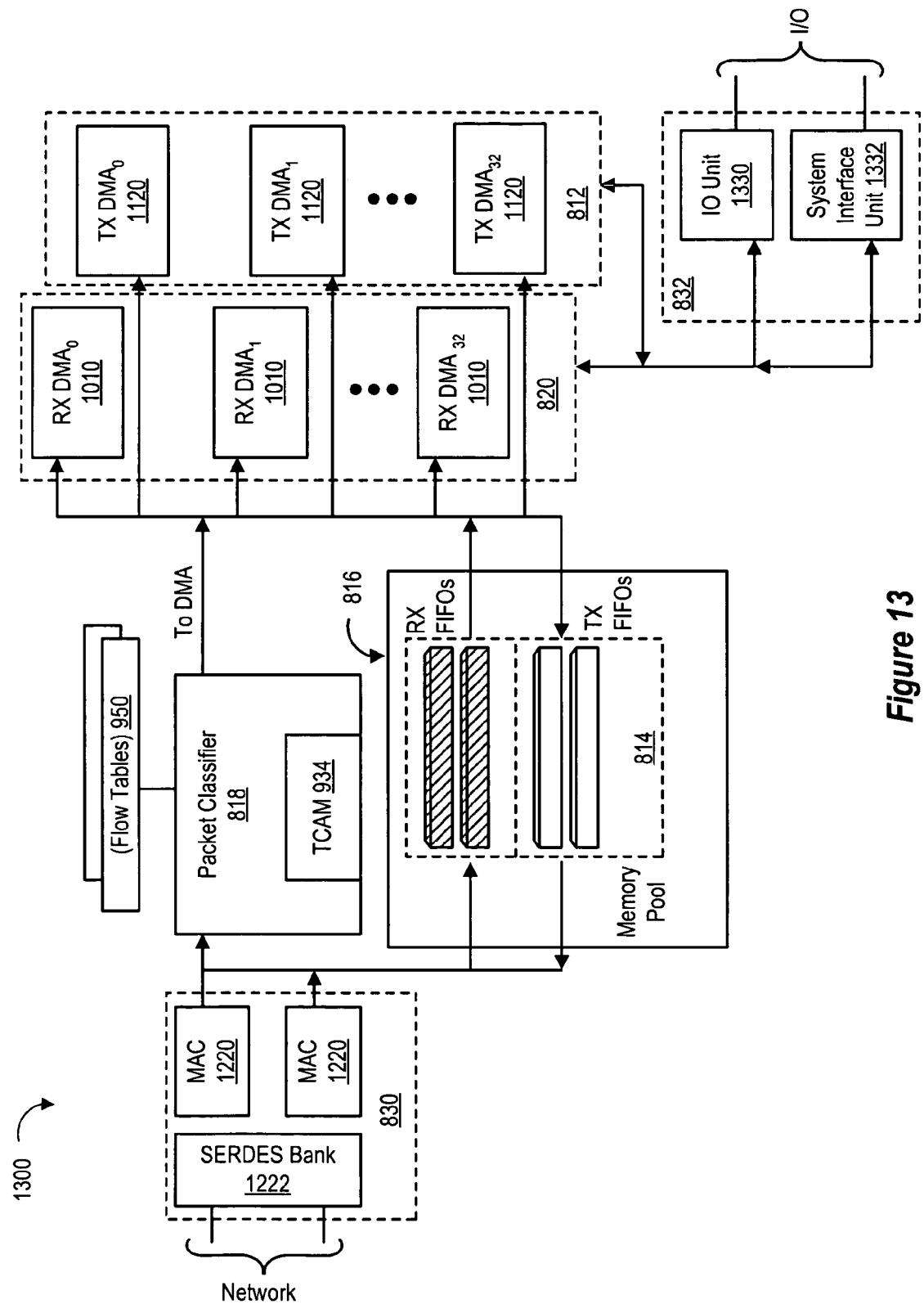
FIG. 13 shows a schematic block diagram of an example of a two port network interface unit.

Referring to FIG. 13, a schematic block diagram of an example of an integrated network interface unit 1300 is shown. In the integrated network interface unit 1300, portions of the four port network interface unit 1200 are included within an integrated solution in which network functions are included with a processor core. (The processor core is omitted from the Figure for clarity purposes).

More specifically, the integrated network interface unit 1300 includes a transmit DMA module 812, a transmit FIFO reorder logic module 814, a receive FIFO module 816, a receive packet classifier module 818, and a receive DMA module 820. The integrated network interface unit 1200 also includes a media access control (MAC) module 830 and a system interface module 832.

The packet classifier module 818 includes a corresponding TCAM module 934. The packet classifier module 818 is coupled to an FC RAM module 950 which stores flow tables for use by the packet classifier module 818.

The receive DMA module 820 includes 32 receive DMA channels 1010. The transmit DMA module 812 includes 32 transmit DMA channels 1120. The MAC module 830 includes two MAC ports 1220 as well as a SERDES bank module 1222. Because there are two MAC ports 1220, the per port receive packet FIFOs 816 include two corresponding receive packet FIFOs and the per port transmit FIFOs 814 include two corresponding transmit FIFOs. The receive and transmit FIFOs are stored within a network interface unit memory pool. The system interface module 832 includes an I/O unit module 1330 and a system interface unit module 1332.

Network Interface Unit Functional Overview

Figure 14:
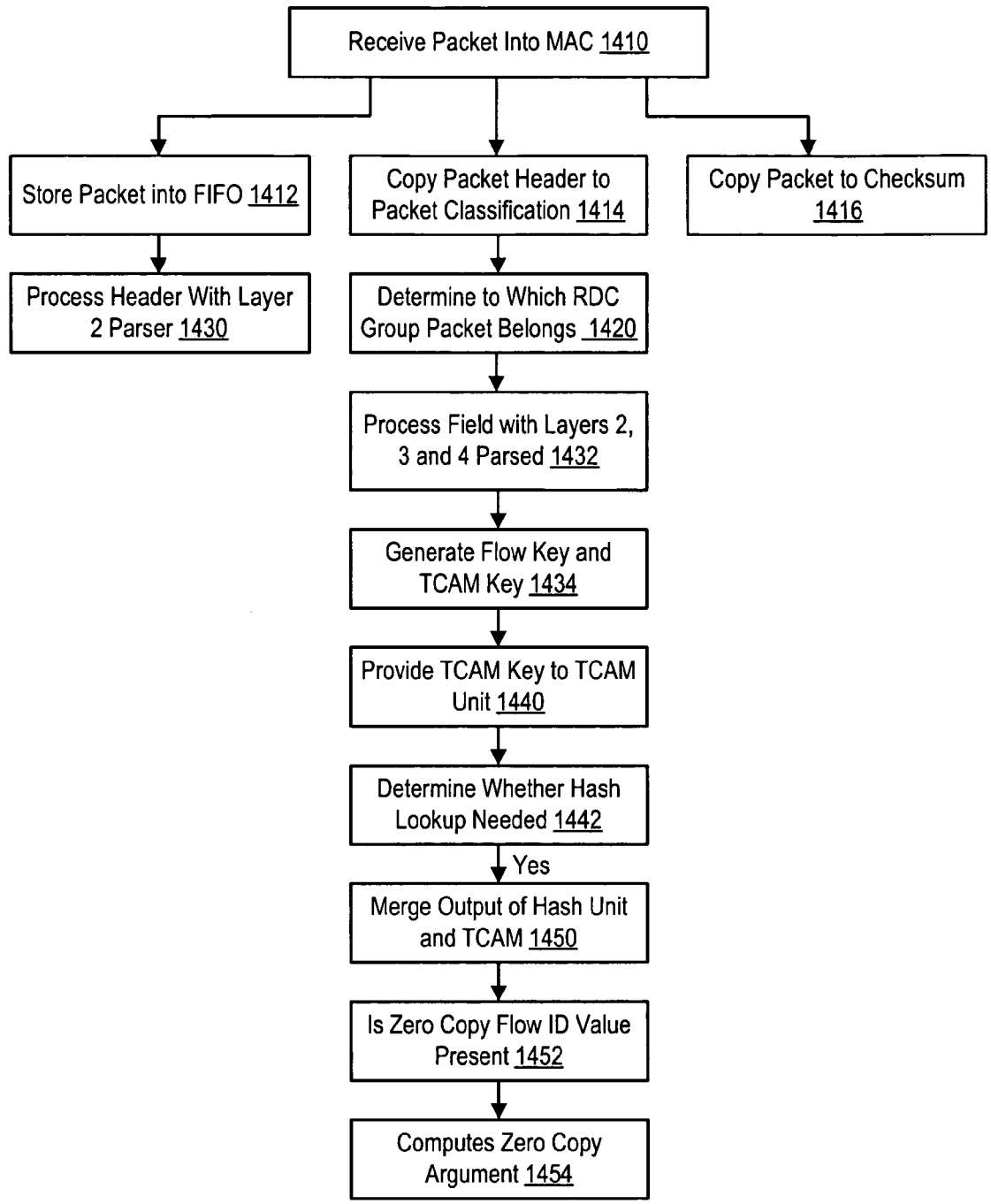
FIG. 14 shows a flow chart of the classification of a packet received by the network interface unit.

Referring to FIG. 14, a flow chart of the classification of a packet received by the network interface unit 110 is shown. More specifically, a packet is received by a MAC port of the MAC module 830 at step 1410. The MAC module 830 includes a plurality of media access controller (MAC) ports that support a network protocol such as an Ethernet protocol. The media access controller ports include layer 2 protocol logic, statistic counters, address matching and filtering logic. The output from a media access controller port includes information on a destination address, whether the address is a programmed individual address or an accepted group address, and the index associated with the destination address in that category.

Packets from different physical ports are stored temporarily in a per port receive packet FIFO at step 1412. The packets are stored into the per port receive FIFO module 816, the header of the packet is copied to the packet classifier module 818 at step 1414. The packet is passed through the checksum module at steps 1416. The packet classifier module 818 determines at step 1420 to which receive DMA channel group the packet belongs and an offset into the receive DMA channel table at step 1420. In one embodiment, the network interface unit 110 includes eight receive DMA channel groups.

Each receive DMA Channel 1010 includes a receive block ring (RBR), a receive completion ring (RCR) and a set of control and status registers. (See, e.g., FIG. 21.) Physically, the receive DMA channels 1010 are allocated as ring buffers in memory system 130. A receive DMA channel 1010 is selected after an incoming packet is classified. A packet buffer is derived from a pool of packet buffers in the memory system 130 and used to store the incoming packet. Each receive DMA channel 1010 is capable of issuing an interrupt based on the queue length of the receive completion ring or a time out. The receive block ring is a ring buffer of memory blocks posted by software. The receive completion ring is a ring that stores the addresses of the buffers used to store incoming packets.

Figure 23:
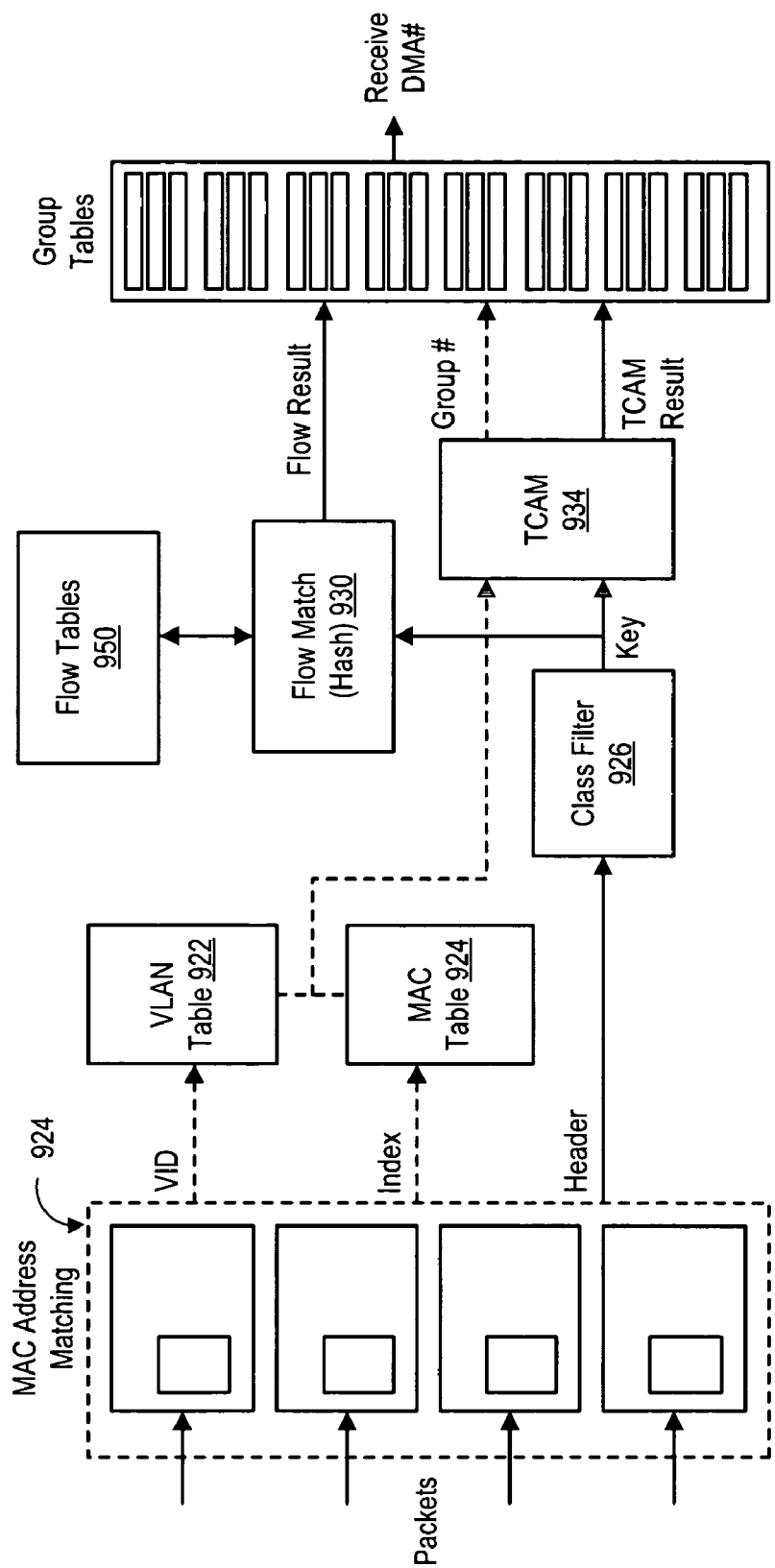
FIG. 23 shows a block diagram of the packet classification hierarchy.

In one embodiment, each receive DMA channel group table includes 32 entries (see, e.g., FIG. 23). Each entry contains one receive DMA channel 1010. Each table defines the group of receive DMA channels that are allowed to move a packet to the system memory. The packet classifier module 818 chooses a table as an intermediate step before a final receive DMA channel 1010 is selected. The zeroth entry of the table is the default receive DMA channel 1010. The default receive DMA channel 1010 queues error packets within the group. The default can be one of the receive DMA channels in the group.

The Layer 2 parser 920 processes the network header to determine if the received packet contains a virtual local area network (VLAN) Tag at step 1430. For a VLAN tagged packet, a VLAN ID is used to lookup into a VLAN table 922 to determine the receive DMA channel table number for the packet. The packet classifier 818 also looks up the MAC address table 924 to determine a receive DMA channel table number based on the destination MAC address information. Software programs determine which of the two results to use in subsequent classification. The output of the Layer 2 parser 920, together with the resulting receive DMA channel table number, is passed to the layer 3 and 4 parser 926.

The Layer 3 and 4 parser 926 examines the EtherType, the Type of Service/Differentiated Services Code Point (TOS/DSCP) field and the Protocol ID/Next header field to determine whether the IP packet needs further classification at step 1432. The Layer 3 and 4 parser 926 recognizes a fixed protocol such as a transmission control protocol (TCP) or a user datagram protocol (UDP). The Layer 3 and 4 parser 926 also supports a programmable Protocol IP number. If the packet needs further classification, the packet generates a flow key and a TCAM key at step 1434.

The TCAM key is provided to the TCAM unit 934 for an associative search at step 1440. If there is a match, the result of the search (i.e., the TCAM result) may override the receive DMA channel Table selection for the Layer 2 or provide an offset into the Layer 2 receive DMA channel Table and ignore the result from the Hash unit 930. The result of the search may also specify a zero copy flow identifier to be used in a zero copy translation.

The TCAM result also determines whether a hash lookup based on the flow key is needed at step 1442. Using the receive DMA channel table number provided by the TCAM module 934, which determines a partition of the external table the hash unit 930 can search, a lookup is launched and either an exact match or an optimistic match is performed. If there is a match, the result contains the offset into the receive DMA channel table and the user data. The result may also contain a zero copy flow identification value used in a zero copy operation.

The output from the hash unit 930 and the TCAM module 934 are merged to determine the receive DMA channel 1010 at step 1450. The receive DMA channel 1010 moves the packet into memory system 130. If a zero copy flow identification value is present as determined at step 1452, then a zero copy function is performed at step 1454 and the receive DMA channel 1010 moves the packet with header payload separation.

A zero copy function is a receive function that performs header vs. payload separation and places payloads at a correct location within pre-posted (per flow) buffers. Each per flow buffer list may be viewed as a zero copy DMA channel. Packet headers are stored into memory system 130 via regular receive DMA channels, as determined by the packet classifier module 818. Using zero copy, the network interface unit 110 may operate on a packet by packet basis without requiring reassembly buffers within the network interface unit 110. Zero copy saves costly data movement operations from a host protocol stack, and in some cases reduces the per packet overheads by postponing header processing until a large set of buffers may be visited. Protocol state machines, and exception processing are maintained in the host protocol stack. Thus, the host's data movement function is removed on a selective basis and subject to instantaneous buffer availability.

Based on the Flow ID, an anchor (part of the Zero Copy state), which is a variable set associating the transmission control protocol (TCP) sequence number space to a buffer list, and implicitly confining zero copy to the current receive TCP window, and a buffer list are retrieved to determine whether payload placement is possible. Then one or more payload DMA operations are determined.

The outputs of the packet classifier module 818 and possibly one or more zero copy DMA operations associated with the packet are stored into the receive control FIFO 862.

The network interface unit 110 supports checksum offload and CRC-32c offload for transmission control protocol/ streaming control transmission protocol (TCP/SCTP) payloads. The network interface unit 110 compares the calculated values with the values embedded in the packet. The results of the compare are sent to software via a completion status indication. No discard decision is made based on the CRC result. Checksum/CRC errors do not affect the layer 3 and 4 classification. Similarly, the error status is provided to software via the completion status indication. Zero copy DMA operations are not performed if checksum errors are detected, though zero copy states are updated regardless of the packet error. The entire packet is stored in system memory using the appropriate receive DMA channel.

The receive packet FIFO 860 is logically organized per physical port. Layer 2, 3 and 4 error information is logically synchronized with the classification result of the corresponding packet.

Figure 15:
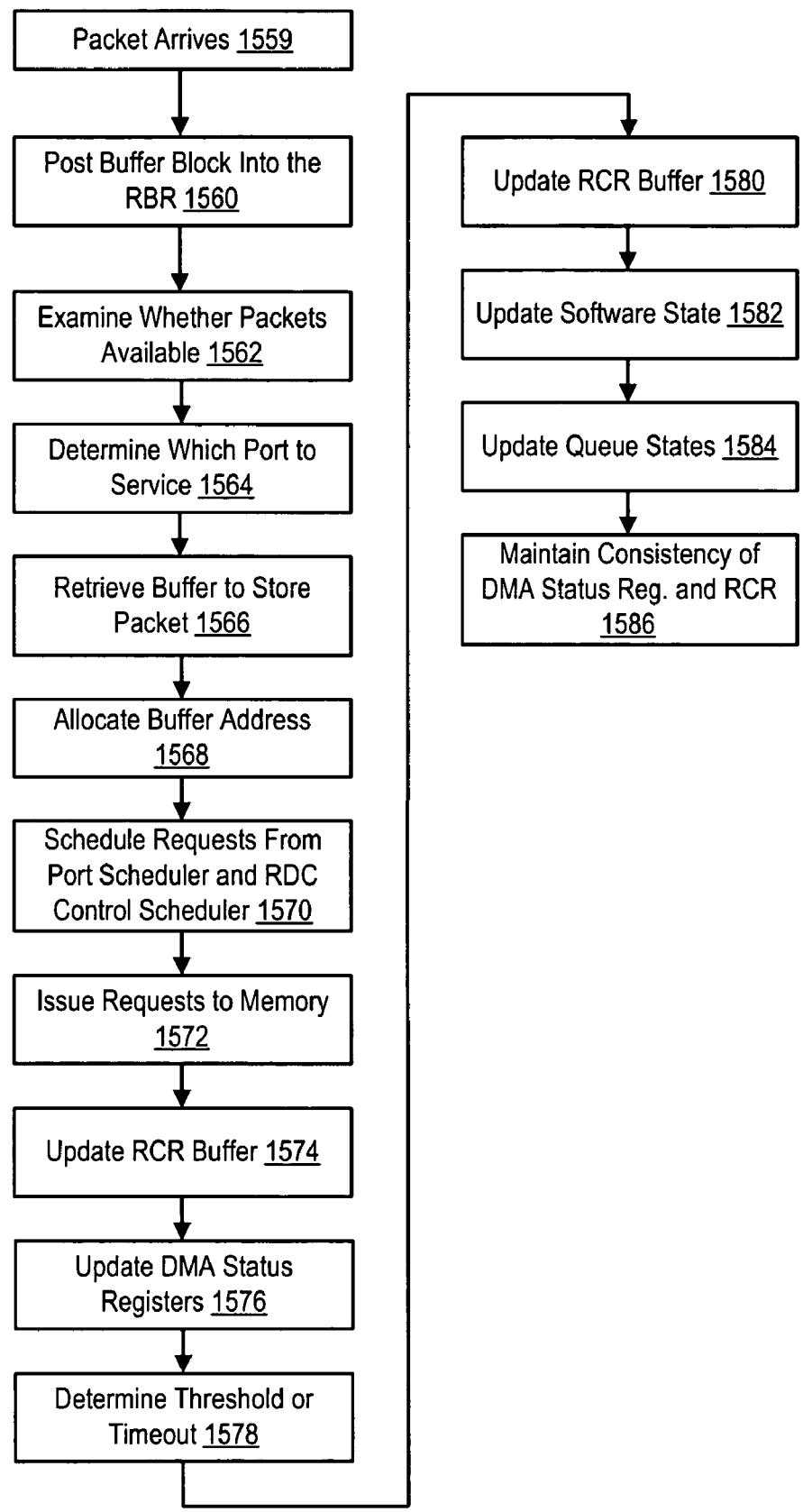
FIG. 15 shows a flow chart of the movement of a packet received by the network interface unit.

Referring to FIG. 15, a flow chart of the movement of a packet by the receive DMA module 820 of the network interface unit 110 is shown. More specifically, logically there are 32 Receive DMA channels (receive DMA channel 0-receive DMA channel 31) available to incoming packets. The datapath engine scheduler 1024 is common across all DMA operations. The datapath engine scheduler 1024 also prefetches receive block pointers or updates the completion ring of the receive DMA channels 1010 and prefetches zero copy buffer pointers.

To support partitioning, each receive DMA channel 1010 supports multiple memory rings. All the addresses posted by software, such as the configuration of the ring buffers and buffer block addresses are range compared and optionally translated when used to reference memory system 130 based on the ranges.

A packet arrives at step 1559. Software posts buffer block pointers into the receive block ring at step 1560. The size of each block is programmable, but fixed per channel. There are one or more packet buffers within a buffer block. Software can specify up to three sizes of packet buffer. Hardware partitions a block. Each block can only contain packet buffers of the same size. For Zero Copy Flows, these packet buffers are used to store packet headers only.

To reduce the per packet overhead, the network interface unit 110 maintains a prefetch buffer 1040 for the receive block ring and a tail pointer for the receive completion ring. When the receive block ring prefetch signal is low, a request is issued to the DMA system to retrieve a cache line of block addresses from the ring. If the receive completion ring tail pointer needs to be updated, a write request is issued. The consistency of the receive completion ring state is maintained by the network interface unit 110. The receive DMA channel control scheduler 1022 maintains the fairness among the receive DMA channels.

The port scheduler 1020 examines whether there are any packets available from the receive packet FIFO 860 and the receive control FIFO 862 at step 1562. The port scheduler 1020 then determines which port to service first at step 1564. The port scheduler 1020 includes a Deficit Round Robin scheduler.

The ports scheduler's determination does not depend on whether the packet is part of a zero copy flow. From the control header, the port scheduler 1020 determines which receive DMA channel 1010 to check for congestion and retrieves a buffer to store the packet at step 1566. Congestion is relieved by a WRED algorithm applied on the receive buffer ring and the receive completion ring. If the receive DMA channel 1010 is not congested, a buffer address is allocated according to the packet size at step 1568. Packet data requests are issued as posted writes. For zero copy flows, the buffers reflected in the receive completion ring buffer 1042 only hold the packet headers.

The datapath engine 1042 fairly schedules the requests from the Port Scheduler and the receive DMA channel control scheduler 1022 at step 1570. The datapath engine 1024 then issues the requests to the memory system 130 at step 1572.

The receive completion ring buffer 1042 is updated after issuing the write requests for the entire packet at step 1574. The DMA status registers are updated every time that the receive completion ring buffer 1042 is updated at step 1576. Software may poll the DMA status registers to determine if any packet has been received. When the receive completion ring queue length reaches a threshold or a timeout occurs, as determined at step 1578, the network interface unit 110 may update the receive completion ring buffer 1042, and simultaneously, write the DMA status registers to a mailbox at step 1580. The software state is then updated and the logical device flag (LDF) may be raised at step 1582. The LDF may then lead to a system interrupt at step 1584. The network interface unit 110 maintains the consistency of the DMA status registers and the receive completion ring buffer 1042 as the status registers reflect the content of the receive completion ring in the memory system 130 at step 1586.

Figure 16:
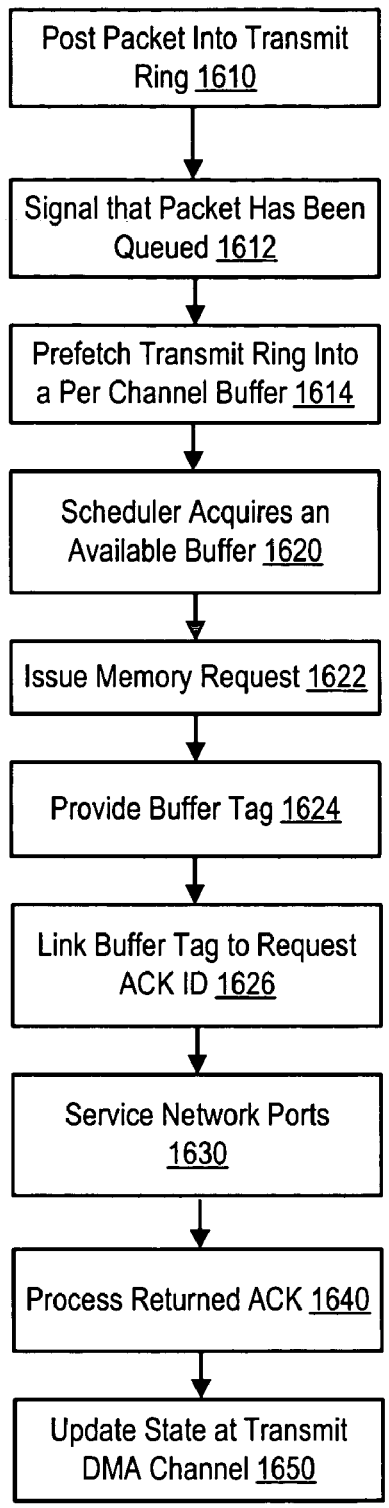
FIG. 16 shows a flow chart of the movement of a packet transmitted by the network interface unit.

FIG. 16 shows a flow chart of the movement of a packet transmitted by the network interface unit 110. More specifically, the transmit DMA module 812 includes 32 transmit DMA channels 1120. Each transmit DMA channel 1120 includes a transmit ring and a set of control and status registers. (See, e.g., FIG. 22.) Similar to the receive channels, each transmit channel supports multiple ranges. Addresses in the transmit ring are subjected to a range checking translation based on the ranges.

The transmit ring includes a ring buffer in memory system 130. Software posts packets into the transmit ring at step 1610 and signals the transmit DMA module 812 that packets have been queued at step 1612. Each packet is optimally built as a gather list. (The network interface unit 110 ensures that the packet size does not exceed the maximum packet size limit.) When the transmit ring is not empty, the network interface unit 110 prefetches the transmit ring entries into a per channel transmit ring prefetch buffer 1142 at step 1614.

Any transmit DMA channel 1120 can be bound to one of the network ports by software. The binding of the ports is controlled by a mapping register 1154 at the per port DRR scheduler 1150. The DRR scheduler 1150 may be switched to a different channel on packet boundary. This switching ensures that there will be no packet interleaving from different transmit DMA channels 1120 within a packet transfer. The DRR scheduler 1150 first acquires an available buffer for that port at step 1620. If a buffer is available, a memory request is then issued at step 1622. A buffer tag identifying the buffer is provided at step 1624 to enable reordering of potentially out of order read returns. The buffer tag is linked to the request acknowledgement identifier for the packet at step 1626. The network ports are serviced in a round robin order via the round robin scheduler 1152 at step 1630. Requests from different ports may be interleaved.

The transmit data requests and the prefetch request share the same datapath to the memory system 130. The returned acknowledgement is first processed at step 1640 to determine whether the returned acknowledgement is a prefetch or a transmit data. The transmit DMA module 812 hardware also supports checksum offload and CRC-32c offload. The transmit FIFO/Reorder Logic module 814 includes checksum and CRC-32c functionality.

When the entire packet has been received into the transmit DMA module 812, the transfer of the packet is considered to be completed and the state of the transmit DMA channel 1120 is updated via the associated status register at step 1650. A 12-bit counter is initialized to zero and tracks transmitted packets. Software polls the status registers to determine the status. Alternately, software may mark a packet so that an interrupt (if enabled) may be issued after the transmission of the packet. Similar to the receive side, the network interface unit 110 may update the state of the DMA channel to a predefined mailbox after transmitting a marked packet.

The transmit and receive portions of the network interface unit 110 fairly share the same memory system interface 832.

Figure 17:
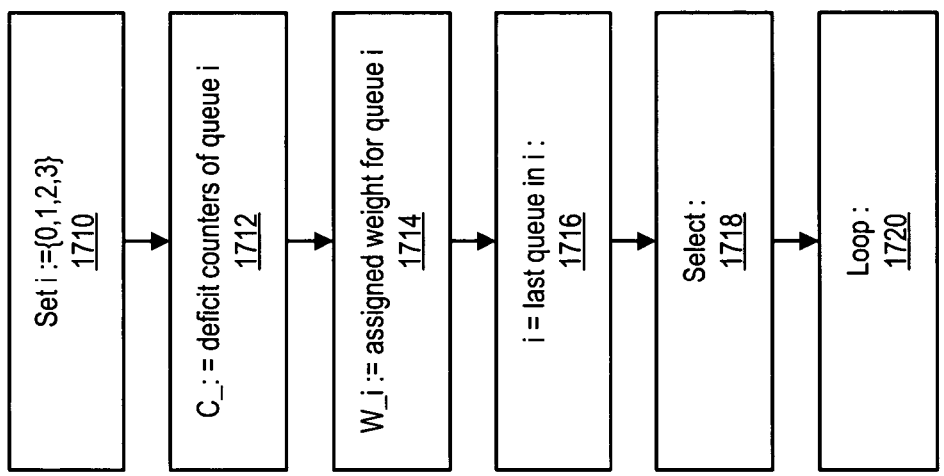
FIG. 17 shows a flow chart of the operation of a port scheduler.

Referring to FIG. 17, a flow chart of the operation of the port scheduler 1020 is shown. More specifically, because a port may be supporting 1 Gbps or 10 Gbps, a rate based scheduler is provided to ensure no starvation. The port scheduler 1020 only switches port at packet boundary and only schedules a port when the port FIFO has at least one complete packet.

The number of queues is set at step 1710 as i:={0, 1, 2, 3}. The number of queues corresponds to the number of ports within the network interface unit 110. Accordingly, for network interface unit 110 having two ports, the number of queues would be set as i:={0, 1}.

Next, the port scheduler 1020 sets the deficit counters of queue i at step 1712 as $C\_i$:=deficit counters of queue i. Next, the port scheduler 1020 sets an assigned weight for the queue i at step 1714 as $W\_i$:=assigned weight for queue i. Next, the scheduler 1020 determines whether a queue is eligible at step 1716 as i=last queue in i. A queue is eligible if the queue has a completed packet. The 'next_queue_in_i' operation returns the first queue in i if the last queue is reached. Next, the port scheduler 1020 performs a select operation at step 1718. Next the port scheduler 1020 performs a loop operation at step 1720.

Figure 18:
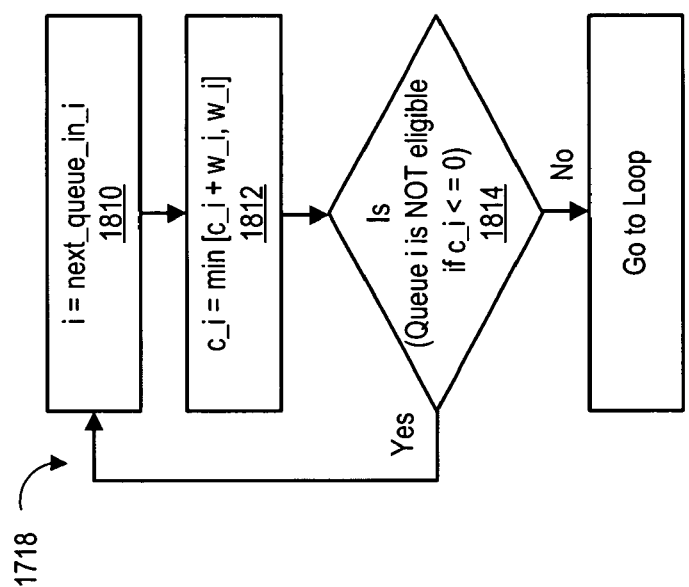
FIG. 18 shows a flow chart of a select operation of the port scheduler.

Referring to FIG. 18, a flow chart showing the operation of the select operation is shown. More specifically, the select operation 1748 starts by setting i equal to the next queue in i at step 1810. Next, the port scheduler 1020 sets $C\_i$ equal to the minimum value of $C\_i$ plus $W\_i$ or $W\_i$ at step 1812. Next, the port scheduler 1020 determines whether the queue i is not eligible for scheduling at step 1814. Queue i is not eligible if $C\_i$ is less than or equal to zero. If queue i is not eligible, then the operation returns to step 1810. If queue i is eligible, then operation proceeds to the loop operation of step 1720.

Figure 19:
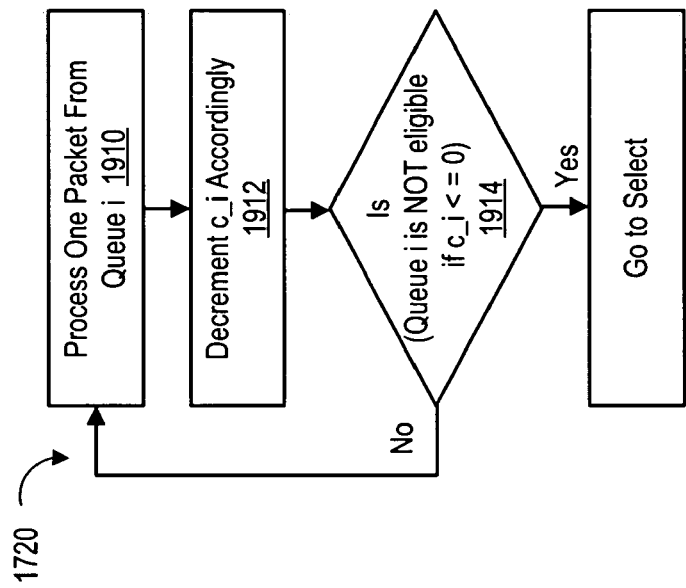
FIG. 19 shows a flow chart of a loop operation of the port scheduler.

Referring to FIG. 19, a flow chart showing the operation of the loop operation is shown. More specifically, the loop operation 1720 starts by processing one packet from queue i at step 1910. Next the port scheduler 1020 decrements $C\_i$ at step 1912. Next, the port scheduler 1020 determines whether queue i is not eligible for scheduling at step 1914. Queue i is not eligible for scheduling if $C\_i$ is less than or equal to zero. If queue i is not eligible for scheduling, then the operation returns to the select operation of step 1910. If queue i is eligible for scheduling then the operation proceeds to the select operation of 1720. $C\_i$ is decremented by the number of 16 B blocks the packet contains. A partial block is considered as one complete block. The port DRR weight register programs the weight of a corresponding port.

Figure 20:
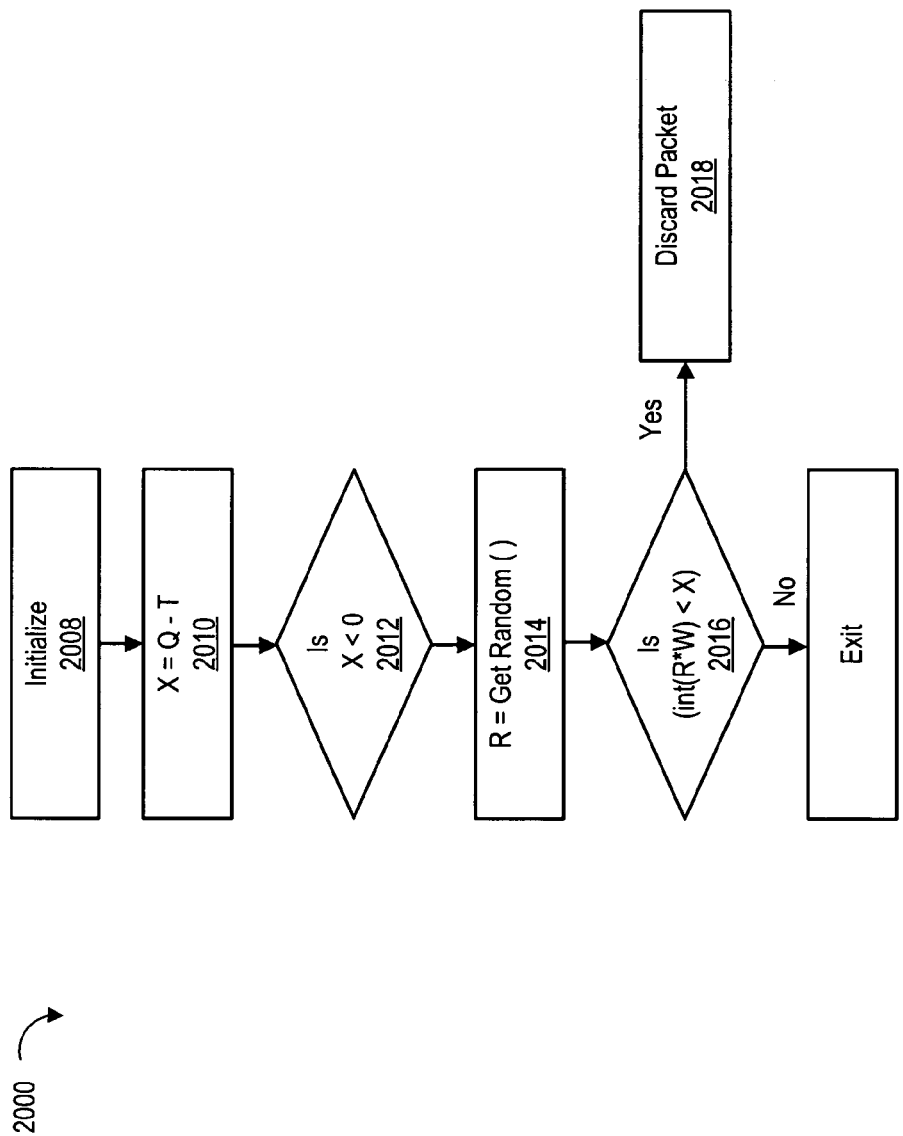
FIG. 20 shows a flow chart of the operation of a weighted random early discard module.

Referring to FIG. 20, a flow chart showing the operation of a weighted random early discard (WRED) module 2000 is shown. A goal of congestion management (such as the use of a weighted random early discard module 2000) is to prevent overloading of the processing entity 120 and to fence off potential attacks that deplete system resources associated with network interfaces. The control mechanism for providing congestion management is to discard packets randomly. The weighted random early discard module 2000 provides the benefit of de-synchronizing the TCP slow start behavior and achieving an overall improvement in throughput.

The resources of a receive DMA channel are captured by two states: the receive completion ring queue length and the number of posted buffers. A DMA channel is considered congested if there are a lot of packets queued up but not enough buffers posted to the DMA channel. A method for determining congestion is to combine the two states. More specifically if Q is a combined congestion measurement, then $Q$=max Receive Completion Ring Queue Length–
[$S$×Receive Block Ring Queue Length].

The receive block ring queue length is scaled up by a constant, S, because a block may store more than one packet.

A WRED function is characterized by two parameters, threshold and window. If the Q is larger than the threshold, then the packet is subjected to a WRED discard operation. The window value determines the range of Q above the threshold where the probabilistic discard is applicable. If Q is larger than (Threshold+Window), the packet is always discarded. Because it is desirable to protect existing connections and fence off potential SYN attacks, TCP SYN packets are subject to a different set of (Threshold, Window) pair.

More specifically, the operation of the WRED module 2000 starts by initializing a plurality of values at step 2008. The values include setting T=Threshold, W=Window and R=Random. Next, the WRED module 2000 sets a value x equal to Q−T at step 2010. Next, the WRED module 2000 determines whether x is less than 0 at step 2012. If x is less than zero, then the operation of the module exits. If x is not less than zero, then the WRED module 2000 obtains a random number between 0 and 1 at step 2014. Next, the WRED module 2000 determines whether an integer value of R*W is less than x at step 2016. If the integer value is less than x, then the packet is discarded at step 2018. If the value is not less than x, then the operation of the module completes.

In one embodiment, the random number is implemented with a 16 bit linear feedback shift register (LFSR) with polynomial such as $$X16+X5+X3+X2+1$$

Network Interface Unit Data Movement Profiles

The network interface unit 110 provides performance based on parallelism, selective offloading of data movement and pipelined usage of an I/O interface. The network interface unit 110 selectively uses direct virtual memory access (DVMA) and physical DMA models. The network interface unit 110 provides partitionable control and data path (via, e.g., hypervisor partitions). The network interface unit 110 provides packet classification for partitions, services and flow identification. The network interface unit 110 is multi-ported for multi-homing, blade architectures and look aside applications.

The network interface unit 110 receives and transmits data movement profiles as described below. More specifically, the receive data movement profile provides that DMA writes are performed in up to 512 byte posted write transactions, that there are a plurality of pipelined write transitions per DMA channel, that the total number of pipelined write transactions is determined based upon I/O and memory latency characteristics, that the receive DMA write PCI-Express transactions have byte granularity and that most DMA writes are initiated with relaxed ordering. The read data movement profile provides for a plurality of pipelined DMA read requests per DMA channel, that the total number of pipelined DMA read requests across channels is determined based upon I/O and memory latency characteristics, that each transmit DMA read request can be up to 2K bytes, that the network interface unit 110 tries to request an entire packet or 2 k whichever is smaller, that the DMA read completions can be partial, but in order for a given request, that the network interface unit 110 handles interleaved DMA read completions for outstanding requests, and that the network interface unit 110 preserves packet ordering per DMA channel despite request or completion reordering. It will be appreciated that any of the data movement profiles may be adjusted based upon the I/O and memory latency characteristics associated within the network system.

DMA channels, which include both receive DMA channels 1010 and transmit DMA channels 1120, are the basic constructs for queuing, and for enabling parallelism in servicing network interface units 110 from different processing entities 120. Thus, DMA channels are serviced independently, thereby avoiding the overhead of mutual exclusion when managing transmit and receive queues. In one embodiment, receive zero copy (i.e., TCP reassembly) is associated with each of the DMA channels but does not consume additional DMA channels. Translation tables are not considered separate channels.

The transmit DMA channels 1120 and receive DMA channels 1010 each include respective kick registers which are used via PIO posted writes to update network interface units 110 regarding how far the hardware may advance on each ring. Completion registers, analogously indicate to the software how far the hardware has advanced, while avoiding descriptor writebacks.

All PIO registers associated with the operation of a DMA channel are separable into pages. Thus, the DMA channels may be managed by their own partitions. The PIO registers, and thus the DMA channels, are groupable so that an arbitrary ensemble of DMA channels can be placed in a single partition.

Both the transmit DMA channels 1120 and the receive DMA channels 1010 cache at least a cache line worth of fetched descriptors to minimize descriptor memory accesses. Similarly, completion updates are batched to fill a cache line whenever possible. Every DMA channel includes a corresponding polling register. The polling register reflects the state of the channel (not empty completion) so that the network interface unit 110 can use a programmable I/O read operation to the polling register.

Figure 21:
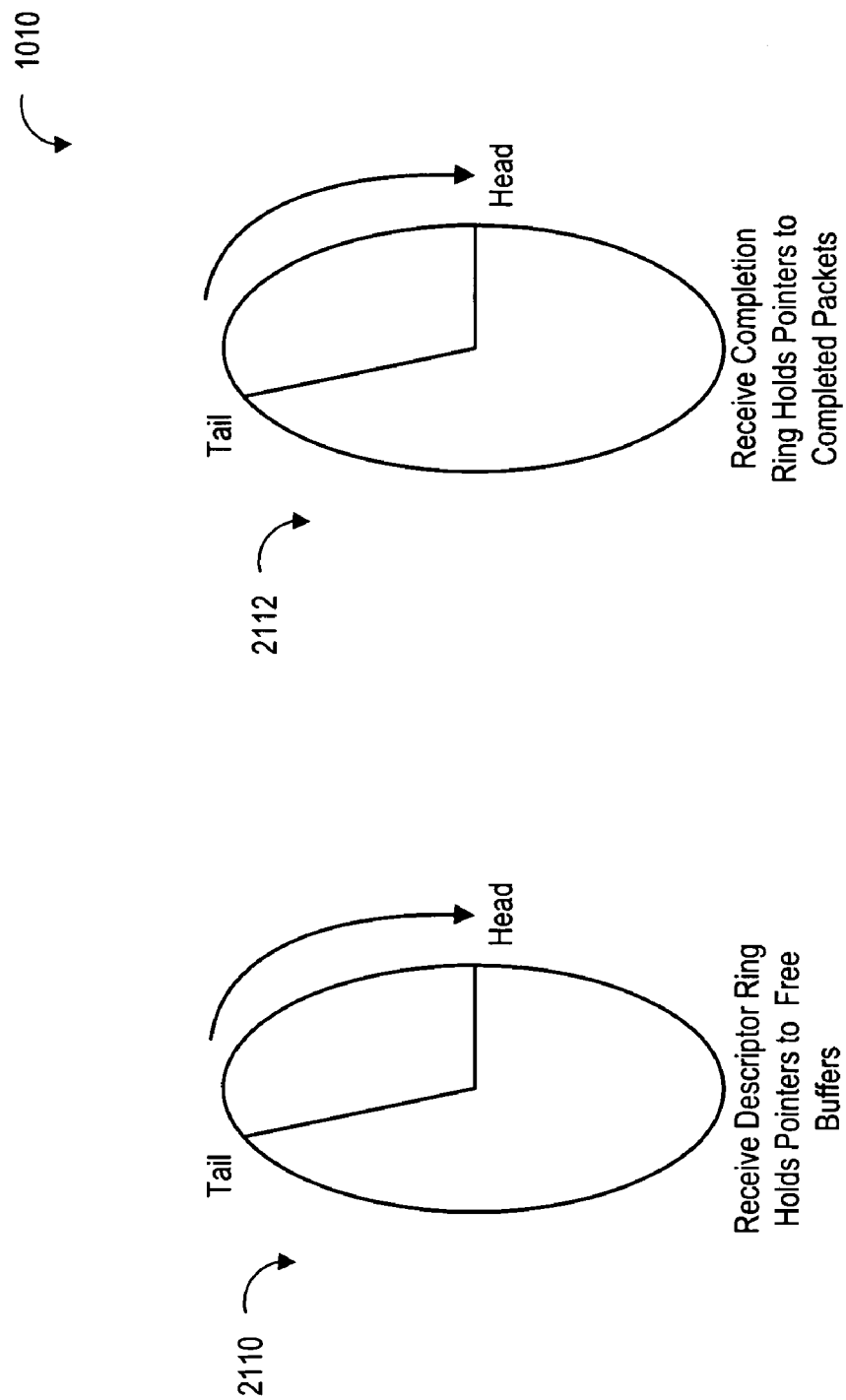
FIG. 21 shows a diagram of a receive DMA channel's data structures.

Referring to FIG. 21, a receive DMA channel 1010 includes a receive descriptor ring 2110 and a receive completion ring 2112. The receive descriptor ring 2110 holds free buffer pointers to blocks of buffers of pre-defined size, typically an operating system page size or a multiple of an operating system page size. Buffer consumption granularity discriminates packet lengths based on three ranges, small, large or jumbo, which are defined by SMALL_PACKET_SIZE, LARGE_PACKET_SIZE, JUMBO_PACKET_SIZE elements, respectively. More specifically, with the small packet length range the length of the packet is less than the value defined by the SMALL_PACKET_SIZE element; with the large packet length range, the length of the packet is greater than the value defined by the SMALL_PACKET_SIZE element and less than or equal to the value defined by the LARGE_PACKET_SIZE element; and, with a jumbo packet length range, the length of the packet is greater than the value defined by the LARGE_PACKET_SIZE element and less than or equal to the value defined by JUMBO_PACKET_SIZE element.

At any time, the receive DMA channel 1010 uses three free buffer pointers cached from its descriptor ring, one buffer is carved up for small packets, another buffer for large packets, and a third buffer for jumbo packets. The PACKET_SIZE thresholds are coarsely programmable per channel and determine the number of packets per buffer and the fixed receive buffer sub-divisions where packets may start. The respective packet pointers are posted to the channel's receive completion ring 2112.

The receive completion ring 2112 therefore defines the order of packet arrival for the receive DMA channel 1010 corresponding to the completion ring. Jumbo packets may exceed the buffer size by spilling over into a second buffer. Two pointers per packet are posted to the receive completion ring 2112 in the case of spillover.

For each receive DMA channel 1010, the receive DMA channel context includes a plurality of elements. More specifically, each receive DMA channel includes a buffer size element; a SMALL_PACKET_SIZE element; a LARGE_PACKET_SIZE element; a JUMBO_PACKET_SIZE element; a receive descriptor ring start pointer element; a receive descriptor ring size element; a receive descriptor ring head pointer element; a receive kick register element; a receive descriptor ring tail pointer element; a receive completion ring start pointer element; a receive completion ring size element; a receive completion ring head pointer element; a receive completion tail pointer element; a receive buffer pointer for SMALL element; a receive Buffer pointer for LARGE element; a receive Polling register element (reflects completion ring queue depth, i.e. the distance between completion head and tail register values); and WRED register elements (thresholds, discard statistics).

The completion ring size is programmed by software to be larger than the descriptor ring size. To accommodate small packet workloads, the ratio between the ring sizes is at least (Buffer size/SMALL_PACKET_SIZE).

Figure 22:
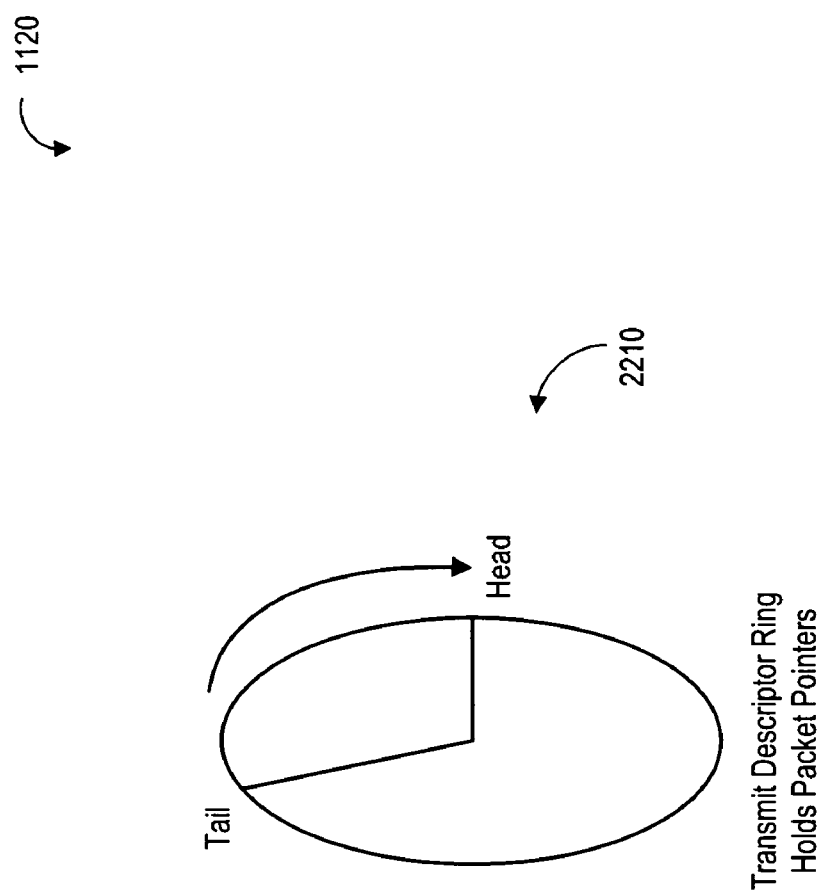
FIG. 22 shows a diagram of a transmit DMA channel's data structures.

Referring to FIG. 22, a transmit DMA channel 1120 includes a single transmit descriptor ring 2210 holding buffer pointers for new packets to be transmitted. Each transmit DMA channel 1120 is associated via register programming with one of the MAC ports, or one trunk when link aggregation is used. Multiple DMA channels may be associated with a single MAC port. Transmit gather is supported, i.e., a packet may span an arbitrary number of buffers.

A transmit operation executes in open loop mode (i.e., with no interrupts) whenever possible. Complete descriptor removal is scheduled at the end of new packet queuing, or periodic interrupts requested at enqueuing time, but there is no need to generate an interrupt for every packet completion or to service the transmit process in any form for the transmit process to make progress.

For each transmit DMA channel 1120, the transmit DMA channel context includes a plurality of elements. More specifically, each transmit DMA channel context includes a transmit descriptor ring start pointer element; a transmit descriptor ring size element; a transmit descriptor ring head pointer element; a transmit kick register element; a transmit descriptor ring tail pointer element; a transmit completion register element; and, a transmit Polling register element (reflects descriptor ring queue depth, i.e. Distance between Head and Tail register values).

The descriptor structures defining the transmit DMA channels 1120 are very simple so that the descriptor structures can efficiently correspond to the DVMA structures without unnecessary input output memory management unit (IOMMU) thrashing for network interface units.

With the other embodiment of the integrated network interface unit 1300, the memory accesses proceed directly to a memory system 130 (after translating virtual addresses to physical address within the four port network interface unit) but without going through any bridge or IOMMU. Memory accesses proceeding directly to a memory system 130 allows superior latency and additional I/O bandwidth, as networking does not compete with any other I/O.

Another subtlety of direct memory interface in the integrated network interface unit 1300 is that memory accesses may complete in arbitrary order when considering multiple banks. A reorder function correlates DMA memory completions, and serializes some operations whenever necessary (either via descriptor update after DMA WR, or polling register update after DMA WR).

Referring to FIG. 23, a block diagram of the packet classification hierarchy is shown. The packet classification hierarchy which is provided by the packet classifier module 818 provides several receive packet classification primitives. These receive packet classification primitives include virtualization, traffic spreading, perfect ternary matches, and imperfect and perfect flow matching.

More specifically, the virtualization packet classification primitive determines the partition to be used for a given receive packet. Virtualization allows multiple partitions to co-exist within a given network interface unit 110 or even a given port within a network interface unit 110 while keeping strict separation of DMA channels and their corresponding processing resources. The shared parts of the network interface unit 110 are limited to the cable connected to the network interface unit 110, the MAC module 830, and the receive packet FIFOs 816 servicing the port. The cable, the MAC module 830 and the receive packet FIFOs 816 provide continuous packet service (i.e., no stalls or blocking). Virtualization can be based on VLANS, MAC addresses, or service addresses such as IP addresses or TCP/UDP ports. Virtualization essentially selects a group of receive DMA channels 1010 as the set of channels where a packet may end up regardless of all other traffic spreading and classification criteria.

The traffic spreading classification primitive is an efficient way of separating traffic statically into multiple queues. Traffic spreading classification preserves affinity as long as the parser is sophisticated enough to ignore all mutable header fields. The implementation of traffic spreading is based on pre-defined packet classes and a hash function applied over a programmable set of header fields. The hash function can be tweaked by programming its initial value. The traffic spreading function can consider or ignore the ingress port, enabling different or identical spreading patterns for different ports.

The perfect ternary match classification primitive is the ultimate classification, where the packet can be associated with flows, or with wild-carded entries representing services, addresses, virtualized partitions, etc. The implementation of perfect match is based on a TCAM match, and is therefore limited in depth. The TCAM value is generally intended to match layer 3 and layer 4 fields for Internet Protocol version 4 (IPv4) and Internet Protocol version 6 (IPv6), and also bind layer 2 virtualization to layers 3 and 4 by keying group numbers in addition to IP headers and transport headers.

The flow matching classification primitive is the association of packets to pre-inserted flows within a large hash table. The hash entries can be used for perfect or imperfect binary matches, where a perfect match consumes four times the space of an imperfect match. Therefore, in general, there is a low but finite probability of having a false match, and also of not being able to insert the desired flow for a specific packet. Flow matching is used for maintaining flow associations to DMA channels for a large number of connections (for example for operating system style hardware classification) as well as zero copy flows. The implementation of flow matching is based on hashing into the hash table 950. In the case of zero copy flows, regardless of the match type, the translation table stage does again a full 5-tuple comparison thus eliminating the risk of false matches. "Don't care" bits for flow matching are masked by a class filter before the hashing function, and are an attribute of the class, rather than the individual entry.

Populating the hash table 950 is optional and software functions with scenarios where the hash table 950 is or is not populated. Furthermore, the hash table 950 is partitionable into a plurality of separate tables (e.g., four separate tables), so that separate partitions can manage their own flows or connections directly without having to serialize access or invoke hypervisor calls in flow setup.

There are a plurality of relationships between the various classification primitives. More specifically layer 2 virtualization results (MAC DA, VLAN) can be factored into the TCAM match via the Group # so that IP addresses/TCP/UDP ports are restricted to VLANs, ingress ports, and MAC addresses. Also, TCAM matches and flow matches are largely independent, except that the TCAM match virtualization determines which hash table partition to search. The TCAM match virtualization results in some serialization between the searches. The TCAM and flow matches are merged, allowing TCAM entries to override or defer to flow matches. The flow match key is not controllable by the TCAM match, and its construction and hash computation may be overlapped with the TCAM search. The ingress port is considered part of all matches and tables so that different policies can be applied across different ports. The flow match and the traffic spreading function use the same key into the hash function. Key masking and assembly is programmable.

The tables have various sizes and roles. For example, the MAC table virtualizes based on the MAC Address index provided by the MAC blocks (e.g., 4 bits) and the ingress port number (e.g., 2 bits). The output of the MAC table is a group # (e.g., 4 bits) and a MAC_Dominates signal to control how to merge this result with the VLAN table result. The VLAN table virtualizes based on VLAN IDs (e.g., 12 bits) and a VLAN_Dominates signal to control how to merge this result. The group tables include 16 sets of receive DMA channels grouped for virtualization. The receive DMA channels are programmed into one of the group tables. All 32 entries of a group table are filled with valid receive DMA channel numbers. Receive DMA channels are written more than once per group table if necessary to fill the table.

Both transmit and receive functions operate as store and forward in and out of the corresponding FIFO. There are fields stored with the packet FIFOs used for control purposes, and there are also dedicated control structures in the form of FIFOs.

Within the receive path, receive packet FIFOs arbitrate for DMA channel scheduling on packet boundaries. The packet at the head of a given receive packet FIFO determines the DMA channel number to use for the packet.

Translation table lookups represent the longest latency step of ingress processing. The pipeline design assumes that every packet goes through translation at ingress, and overlaps the translation with data flowing into the Receive packet FIFO.

Some receive control information is stored in the receive buffers along with the receive packets while other fields are deposited into the descriptors themselves. Information consumed by the driver goes to descriptors, and information needed above the driver stays in the buffer.

In addition, receive buffers accommodate a number of reserved locations per buffer to be used by software. The number is programmable per channel and up to 86 bytes. Receive packets using TCP re-assembly derive their DMA addresses from the translation result in the form of a pair of (address, length) pairs with arbitrary byte granularity.

Within the transmit path, there is one FIFO per MAC port. Packets are read from the head of the FIFO into the MAC port only when a full packet is ready (for checksum insertion purposes). Packets may be written in interleaved fashion into the transmit FIFO to accommodate out of order memory read completions. The transmit reorder module 852 produces the transmit FIFO address location for writing memory read (MEM RD) completions based on the transaction ID, address, byte count, and byte enables of the completion. A packet may require more than one request and therefore the packet may consume multiple transaction IDs. The transmit reorder module 852 handles as many transaction IDs as the number of pipelined MEM RD requests issued by the network interface unit 110. Completions are of arbitrary size up to Max_Payload_Size for the PCI-Express receive direction.

The transmit reorder module 852 therefore manages the re-assembly of completions at insertion time into Transmit FIFOs 850, and in the process of doing so enforces a network packet order per MAC/DMA channel that is identical to the memory read request order for the transmit DMA channel 812.

The memory read request order is derived from the packet descriptor order of each transmit DMA channel 1120, with the freedom to schedule across transmit DMA channels 1120 with no order constraints.

The transmit reorder module 852 also determines when a given packet is completely written into the transmit FIFO 850 by determining that all the packet requests are completely satisfied. For simplicity purposes the request order is enforced within a transmit FIFO 850 even for requests from different transmit DMA channels 1120.

TCP checksum insertion is performed by maintaining partial checksums per packets in the transmit reorder module 852 and using the additive property of the 1's complement checksum to overcome completion interleaving.

For the integrated network interface unit 1300, the reorder module 852 is simplified because MEM RD completions are of fixed size, and possibly a smaller number of outstanding requests are pipelined.

The data buffering includes a plurality of discard policies. More specifically, the discard policy for a transmit operation is that there is not congestive discard in the transmit data path because the four port network interface unit only requests from memory packets that fit in the corresponding Transmit FIFO.

The discard policy for a receive is that congestive discard for Receive occurs under several scenarios at the boundary between a receive FIFO module 816 and a receive DMA channel 1010. Accordingly, the receive FIFO module 816 is always serviced, be it by the receive DMA channel 1010 corresponding to the packet at the head of the receive FIFO module 816, or by discarding from the head of the receive FIFO module 816. Packets are never backpressured at the receive FIFO module 816. All discard operations are on packet boundaries.

There are a plurality of different scenarios that may trigger packet discard. More specifically, a DMA congestion scenario where no buffer is posted to the descriptor ring at the time the packet is at the head of its receive FIFO module 816 may trigger packet discard. A DMA disabled scenario where a receive DMA channel 1010 is disabled at the time the packet is at the head of its receive FIFO module 816 may trigger packet discard. A random early discard (RED) scenario which is implemented per receive DMA channel 1010 which determines that queue length requires packet discard, and randomizer determines that the next packet is the victim. A classifier triggered scenario when the packet classifier 818 indicates a packet is to be dropped; the packet is dropped from the head of the receive FIFO module 816. The classification result which is carried by the receive control FIFO 862 includes the packet drop indication. A late discard scenario occurs in cases of congestion in the middle of the packet, or packet malfunction (Length or CRC based) signaled by the MAC at the end of a packet, packet discard is marked on the FIFO ingress side, possibly by rewriting the first receive packet FIFO 860 with a special marker sequence. The design may also reclaim most of the offending packet's FIFO locations used so far by rewinding the ingress pointer.

Packet drop at the receive packet FIFO tail also occurs when the receive packet FIFO 860 fills. For example, for lookup congestion, if the packet classifier 818 fails to keep up with averaged packet rate (averaged by the receive packet FIFO depth), the receive control FIFO 862 is updated with results at a slower rate than the receive packet FIFO 860. Should the receive packet FIFO fill, the affected packet is dropped on the FIFO ingress side by reclaiming the locations used so far.

The hypervisor 312 adds a level of indirection to the physical address space by introducing real addresses. Real addresses are unique per partition, but only physical addresses are system unique. There are two types of hypervisor hooks with the address usage of network interface units. These two hooks include any slave access to network interface unit registers intended to be directly manipulated by software in the partition without the hypervisor 312 (or equivalent) coordination is grouped into pages that the network system memory management unit can map separately and any DMA access originated from network interface units apply an address relocation mapping based on a per partition offset and range limit. The offset and limit values are programmable through yet another partition different from the partition that posts addresses to the DMA channel.

The level of indirection can be used in a hypervisor environment to achieve full partition isolation. This level of indirection can also be used in non-partitioned environments to avoid having to serialize access to shared resources in the data path. Providing a level of indirection is valuable to enable scalable performance.

The network interface unit 110 includes a plurality of register groups. These register groups include a MAC/PCS register group, a classification register group, a virtualized register group, transmit and receive DMA register groups, a PCI configuration space register group, an interrupt status and control register group, a partition control register group, and an additional control register group.

The register structure and event definition relies on separating datapath interrupt events so that the events can be mapped univocally to strands or processors, regardless of whether the processors enable interrupts, poll, or yield on an event register load.

The actual event signaling for network interface units 110 is based on interrupt messages (MSIs) to different addresses per target. In the integrated network interface unit, the event signaling is done towards a set of interrupt registers placed close to the processor core.

Network System Software Stack

Referring again to FIG. 4, the interface unit device driver 420 assists an operating system 430 with throughput, connection setup and teardown. While higher bandwidth data rates may saturate the network stacks on a single processor, the network system helps to achieve throughput networking by distributing the processing.

The network system device driver 420 programs the packet classifier 818 for identification of flows or connections to the appropriate processor entities 120. The network interface unit packet classifier 818 is programmed to place well defined flows on the appropriate DMA channel.

A model of a flow can occur in a single stage or multiple stages, so that different processing entities 120 can service different receive channels. A single stage is when a packet is received, is classified as a flow, and sent to the software stack for processing without further context switching. Multiple stages is when packets which are classified as flows are queued and then some other thread or operating system entity is informed to process the packets at some other time.

The operating system 430 creates a queue instance for each processor plus a thread with affinity to that processor entity 120. By providing flow affinity to a processor entity 120, packet ordering is maintained on receive flows. Also, maintaining affinity of receive and transmit packets that belong to the same connection enables better network system performance by providing the same context, no processor cross-calls and keeps the caches "warm".

The network system software stack 410 migrates flows to insure that receive and transmit affinity is maintained. More specifically, the network system software stack 410 migrates receive flows by programming flow tables. The network system software stack 410 migrates transmit flows by computing the same hash value for a transmit as the network interface unit 110.

The connection to a processor affinity is controlled by the operating system 430, with a network interface unit 110 and the network interface unit device driver 420 following suit. There are at least two alternatives for controlling the affinity. In one alternative, the operating system 430 presently associates each flow with the processing entity 120 that creates the flow either at "open" or at "accept" time. In this case, the flow to DMA channel mapping of a connection is passed to the network interface unit 110 and associated network system software and stored in the hash tables 950 for use by the receive packet classifier 818. The other alternative is based on a general fanout technique defined by the operating system 430 and does not use a flow table entry. The network interface unit device driver 420 can be a multi-threaded driver with single thread access to data structures.

The network system software stack 410 exploits the capabilities of the network interface unit 110. The packet classifier 818 is optionally programmed to take into account the ingress port and VLAN tag of the packet. This programming allows multiple network interface units 110 to be under the network system software stack 410.

Figure 24:
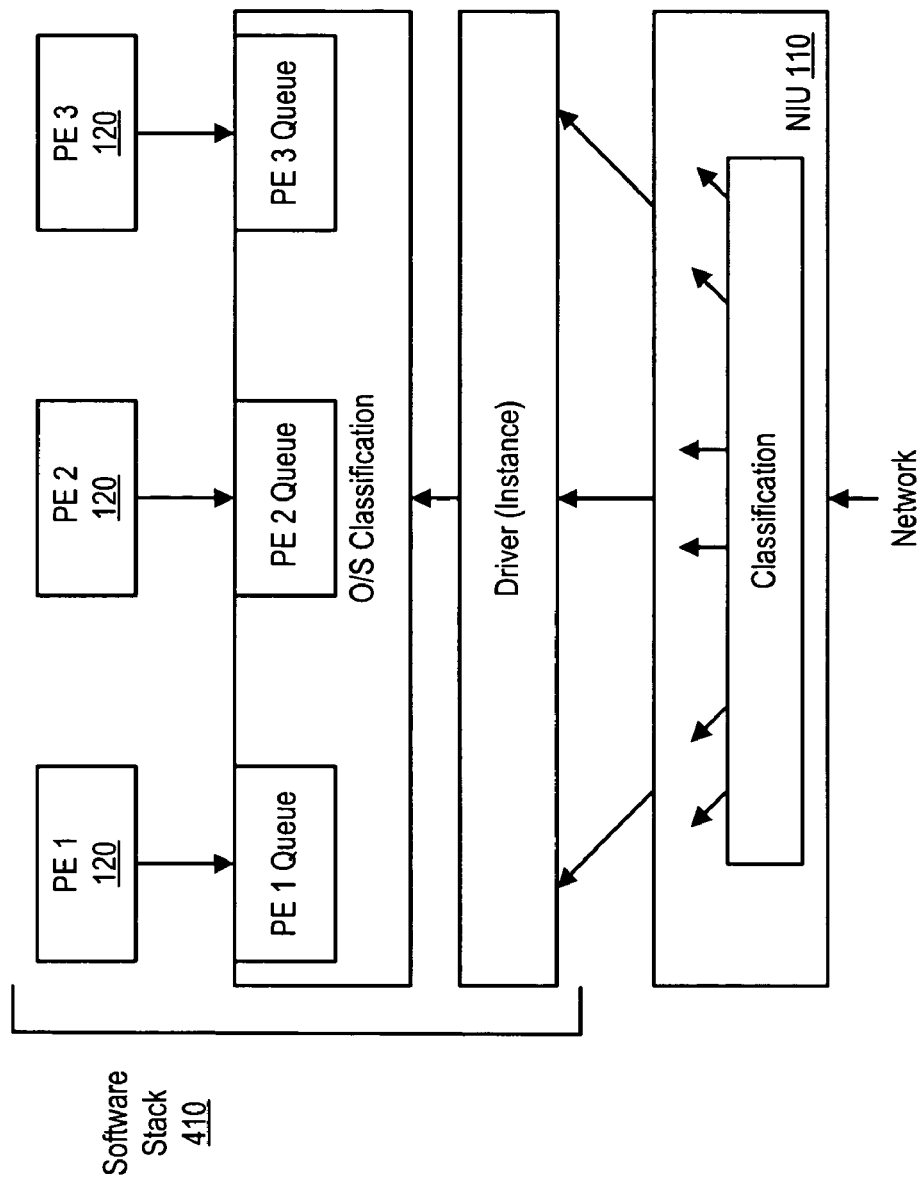
FIG. 24 shows a flow diagram of a receive flow between a network interface unit and a network system software stack.

Referring to FIG. 24, a flow diagram of a receive flow between a network interface unit and a network system software stack 410 is shown. When the device driver 420 is functioning on the receive side with multiple processor receives, the network interface unit 110 is programmed to provide hash based receive packets spreading which sends different IP packets to different DMA channels. The network interface unit packet header parsing uses source and destination IP addresses, and the TCP port numbers, (e.g., TCP 5-tuples). These fields along with the port and VLAN uniquely identify a flow. Hashing is one of many ways to spread load.

When the network interface unit 110 is functioning in an interrupt model, when a packet is received, it generates an interrupt, subject to interrupt coalescing criteria. Interrupts are used to indicate to a processor entity 120 that there are packets ready for processing. In the polling mechanism, reads across the I/O bus 112 are performed to determine whether there are packets to be processed.

The network interface unit 110 includes two modes for processing the received packets. A standard interrupt based mode is controlled via the device driver 420 and the second polled based mode that is controlled by the ULP. The ULP (in this case the operating system 430) exploits the appropriate mode to meet certain performance goals. Flows that have been classified as exact matches by the combination of the network interface unit packet classifier 818 and the device driver 420 are sent directly to the operating system 430 within the receive interrupt context or queued and pulled via polled queue threads. In either case, the network interface unit packet classifier 818 helps map particular flows to the same processing entity 120.

An interrupt coalescing feature per receive descriptor can provide multiple packet processing and chaining. On the interrupt module, the device driver 420 registers the interrupt service routine with the operating system 430 which then tries to spread the processing to different processing entities 120. The device driver 420 configures the network interface unit 110 to exploit the DMA channels, translation table, buffer management, and the packet classifier.

On the polled mode module, the queue thread or another thread pulls packets out of the receive queue. The polled mode module includes interfaces between the ULP and the network interface unit 110.

The interface to the network interface unit device driver 420 is via either a device driver specific interface or via an operating system framework.

For packets which are not classified appropriately, the device driver 420 uses a standard operating system interface.

The network interface unit 110 places a number of packets into each page sized buffer by dividing the buffer into multiple packet buffers. Depending on packet size distribution, buffers may be returned in a different order than they were placed on the descriptor ring. Descriptor and completion ring processing is handled in the interrupt handler or invoked from the thread model.

Figure 25:
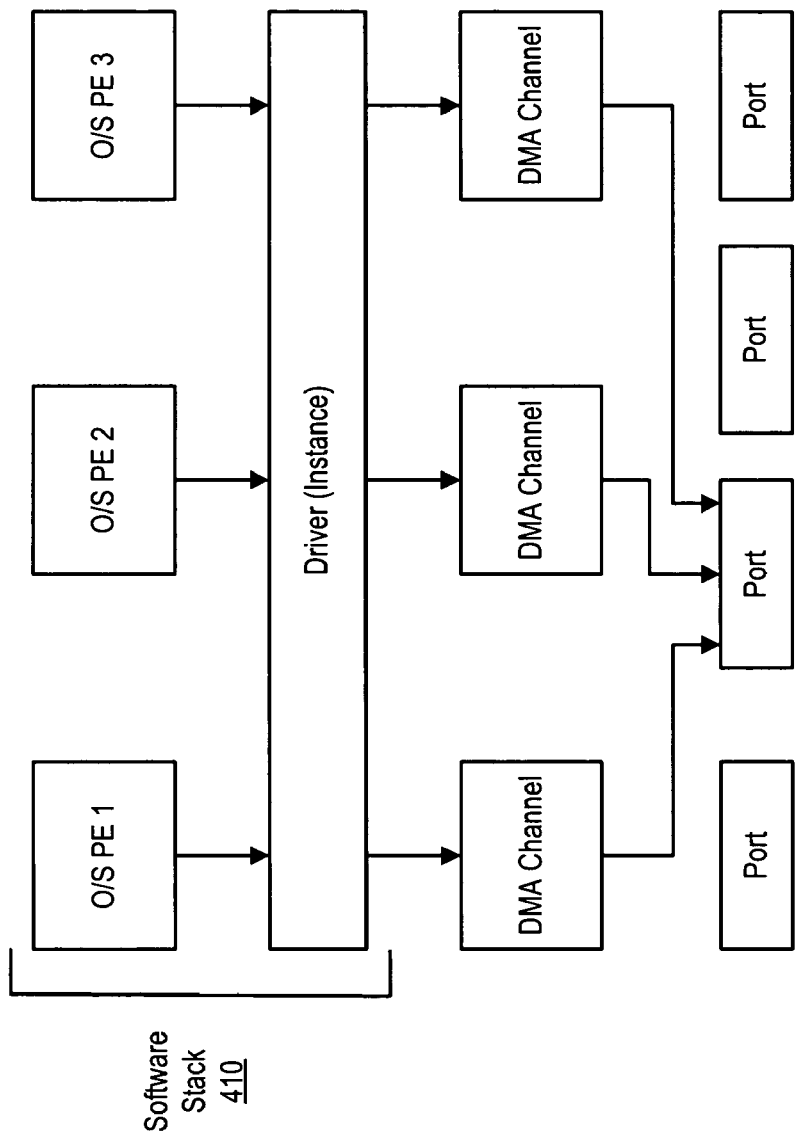
FIG. 25 shows a flow diagram of a transmit flow between a network interface unit and a network system software stack.

Referring to FIG. 25, the flow of a transmit flow between a network interface unit and a network system software stack 410 is shown. When the device driver 420 is functioning at the transmit side, the device driver 420 provides one of two approaches, an IP queue fanout approach and a hash table approach.

The IP queue fanout approach uses a fanout element to potentially help provide better affinity between transmit and receive side flow processing. If a network function uses the same hash as the network interface unit packet classifier 818, then the operating system 430 distributes "open" or "accept" connections to the same queue as the network interface unit packet classifier 818.

The fanout approach provides processor affinity to flows/connections without the hash table. All incoming flows classified by the network interface unit packet classifier 818 come to the operating system 430 on the same processing entity 120. So, the accept connection function uses the same queue and the "open" connection function uses the hash algorithm to fan the packet out to the right queue. Thus, the queue fanout approach enables the network interface unit device driver 420 and the operating system 430 to exploit the affinity of a flow/connection to a particular processing entity 120.

The hash table approach uses a mechanism for load balancing the IP packets to the appropriate processing entity 120 based on transmit affinity. If the operating system 430 wants to drive the affinity from a transmit perspective, then the operating system 430 exploits the hash table interface provided by the network interface unit 110. The application sourcing data running on a particular processing entity 120 (e.g., CPU#n) results in the network interface unit device driver 420 programming the hash table 950 so that received packets for that flow are sent to the particular processing entity 120 (e.g., CPU#n). The hash table 950 provides the capabilities to manage a large number (e.g., four million) of flows. Each entry in the hash table 950 allows a flow to have a well defined processing entity 120 plus some pointer, e.g., a pointer to the connection structure.

The hash table approach provides interfaces which are defined between the operating system 430 and the device driver 420 to program the hash table 950. Before sending out a TCP SYN packet for active open or before sending TCP SYN ACK or TCP ACK, the entries in the hash table 950 are updated according to the processing entity 120 on which the connection is being initiated or terminated as the case may be. Updating the hash table allows subsequent packets for that flow to come to the same processing entity 120. The entries in the flow are inserted before the packet is sent on the wire (i.e., sent onto the network).

One feature of the network interface unit 110 on the transmit side is the support for multiple transmit descriptor rings per port, allowing multiple threads to send packets concurrently to the same port and even use some of the queues for qualities of service (QOS) for outbound traffic. A transmit descriptor is associated with a particular VLAN and at during the configuration of the network interface unit 110. The network interface unit 110 ensures that a given flow is always associated with the same transmit descriptor ring.

There are two approaches for sending a flow to a given port, a device driver approach and an operating system defined approach. With the device driver approach, the device driver 420 controls the fanning out of the flows to a given transmit descriptor. With the operating system defined approach, an API is defined which allows informing the device driver 420 of which transmit descriptor to use. With either approach, the same flow always uses the same descriptor. Thus, multiple flows can come concurrently into the device driver 420 on different transmit descriptors.

The device driver 420 performs the spreading of the flows that come down from the operating system 430. The device driver 420 includes a map identifying which physical ports to which transmit queues. The device driver approach identifies the transmit descriptor by a hashing algorithm and distributes the packets to different descriptors but tied to the same port. The attachment on which the packet comes to the device driver 420 of operating system parameter is used to identify the port. Flow control is defined for the operating system programming interface. If all transmit descriptors that are tied to the given ports are locked, then the device driver 420 informs the operating system 430 to queue the packets in its queue. This helps in alleviating the lock connection issue associated in a multiprocessing environment.

Thus, because multiple flows can be transmitted on the same port, all transmit descriptors associated with that port could be busy. The locks are mainly for preventing the descriptor entries from being used by two separate threads and are desirable to be held for a very short duration.

If the operating system 430 wants to fan out the packets to different descriptors then the operating system 430 has to ensure that the same flow always uses the same transmit descriptor. The operating system 430 provides the port and the appropriate transmit descriptor over which the flow needs to go. The operating system API also adheres to the flow control push back from the device driver 420 in case the transmit descriptors are already in use.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while particular architectures are set forth with respect to the network system and the network interface unit, it will be appreciated that variations within these architectures are within the scope of the present invention. Also, while particular packet flow descriptions are set forth, it will be appreciated that variations within the packet flow are within the scope of the present invention.

Also for example, the above-discussed embodiments include modules and units that perform certain tasks. The modules and units discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules and units is for illustrative purposes. Alternative embodiments may merge the functionality of multiple modules or units into a single module or unit or may impose an alternate decomposition of functionality of modules or units. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for increasing page locality within a networking system operationally attached to a plurality of processing entities, each processing entity either sharing or including a corresponding one of a plurality of memory hierarchies, each memory hierarchy having a table of pages temporally managed by access from the networking system, the method comprising:

for each memory hierarchy, providing one or more dedicated memory access channels between the memory hierarchy and a network interface configured to receive information;

moving information to and from pages in the corresponding memory hierarchy of a particular processing entity via the corresponding memory hierarchy's one or more dedicated memory access channels;

classifying information being received by the network interface based upon a plurality of classification criteria and determining a particular memory hierarchy for the information being received based on said classifying; wherein said criteria comprises two or more of: a network address, a packet size, and a control structure status that indicates whether information includes a control structure; and transferring the information being received to the particular memory hierarchy through the particular memory hierarchy's one or more dedicated memory access channels such that the probability that a page entry of the particular memory hierarchy will be reused over multiple consecutive accesses is increased.

2. The method of claim 1 wherein:

the table of pages is comprised within a memory management unit supporting virtual address to physical address translation, wherein the table of pages includes a plurality of entry locations; and maximizing page locality includes reducing a likelihood of a page table entry being evicted when the memory hierarchy of a particular processing entity is accessed.

3. The method of claim 1 further comprising:

discriminating between packets based on their size, and packing multiple packets into large memory buffers based upon the size of the packet.

4. The method of claim 1 further comprising:

packing control structures into larger buffers to maximize the number of control structures sharing a single entry within the table of pages.

5. An apparatus for increasing page locality within a networking system operationally attached to a plurality of processing entities, each processing entity either sharing or including a corresponding one of a plurality of memory hierarchies, each memory hierarchy having a table of pages temporally managed by access from the networking system, the apparatus comprising:

for each memory hierarchy, one or more dedicated memory access channels between the memory hierarchy and a network interface configured to receive information;

means for moving information to and from pages in the corresponding memory hierarchy of a particular processing entity via the corresponding memory hierarchy's one or more dedicated memory access channels;

means for classifying information being received by the network interface based upon a plurality of classification criteria and determining a particular memory hierarchy for the information being received based on said classifying; wherein said criteria comprises two or more of: a network address, a packet size, and a control structure status that indicates whether information includes a control structure; and means for transferring the information being received to the particular memory hierarchy through the particular memory hierarchy's one or more dedicated memory access channels such that the probability that a page entry of the particular memory hierarchy will be reused over multiple consecutive accesses is increased.

6. The apparatus of claim 5 further comprising:

a memory management unit, the table of pages being comprised within the memory management unit, wherein the memory management unit is configured to support virtual address to physical address translation, wherein the table of pages includes a plurality of entry locations; and, means for maximizing page locality by reducing a likelihood of a page table entry being evicted when the memory hierarchy of a particular processing entity is accessed.

7. The apparatus of claim 5 further comprising:
means for discriminating between packets based on their size, and packing multiple packets into large memory buffers based upon the size of the packet.

8. The apparatus of claim 5 further comprising:
means for packing control structures into larger buffers to maximize the number of control structures sharing a single entry within the table of pages.

9. A network system comprising:
a network interface configured to receive information;
a plurality of processing entities coupled to the network interface, each of the plurality of processing entities configured to either share or include a corresponding one of a plurality of memory hierarchies, each memory hierarchy having a table of pages temporally managed by access from the network interface;
for each memory hierarchy, one or more dedicated memory access channels between the memory hierarchy and the network interface; and
wherein the network interface is configured to:
  move information to and from pages in the corresponding memory hierarchy of a particular processing entity via the corresponding memory hierarchy's one or more dedicated memory access channels;
  classify information being received by the network interface based upon a plurality of classification criteria and determine a particular memory hierarchy for the information being received based on said classifying; wherein said criteria comprises two or more of: a network address, a packet size, and a control structure status that indicates whether information includes a control structure;
  transfer the information being received to the particular memory hierarchy through the particular memory hierarchy's one or more dedicated memory access channels such that the probability that a page entry of the particular memory hierarchy will be reused over multiple consecutive accesses is increased.

10. The network system of claim 9 further comprising:
a memory management unit, the table of pages being comprised within the memory management unit, the memory management unit configured to support virtual address to physical address translation, the table of pages including a plurality of entry locations;
and wherein the network interface is configured to increase page locality by reducing a likelihood of a page table entry being evicted when the corresponding memory hierarchy of a particular processing entity is accessed.

11. The network system of claim 9 wherein:
the network interface is configured to discriminate between packets based on their size, and pack multiple packets into large memory buffers based upon the size of the packet.

12. The network system of claim 9 wherein:
the network interface is configured to pack control structures into larger buffers to maximize the number of control structures sharing a single entry within the table of pages.

* * * * *